(12) United States Patent
Kanoh et al.

(10) Patent No.: US 11,472,428 B2
(45) Date of Patent: Oct. 18, 2022

(54) VEHICLE CONTROL SYSTEM AND CONTROL METHOD

(71) Applicant: HONDA MOTOR CO., LTD., Tokyo (JP)

(72) Inventors: Tadahiko Kanoh, Wako (JP); Jun Ochida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 26 days.

(21) Appl. No.: 16/534,390

(22) Filed: Aug. 7, 2019

(65) Prior Publication Data

US 2019/0359225 A1 Nov. 28, 2019

Related U.S. Application Data

(63) Continuation of application No. PCT/JP2017/040211, filed on Nov. 8, 2017.

(30) Foreign Application Priority Data

Feb. 23, 2017 (JP) .............................. JP2017-032533

(51) Int. Cl.
*B60W 50/12* (2012.01)
*B60W 30/18* (2012.01)
(Continued)

(52) U.S. Cl.
CPC ............ *B60W 50/12* (2013.01); *B60W 30/18* (2013.01); *G05D 1/02* (2013.01); *B60W 2050/0062* (2013.01); *B60W 2540/215* (2020.02)

(58) Field of Classification Search
CPC .................. B60W 50/12; B60W 30/18; B60W 2540/215; B60W 2050/0062; G05D 1/02
See application file for complete search history.

(56) References Cited

U.S. PATENT DOCUMENTS 4,749,238 A * 6/1988 Singleton .............. B60T 13/662
303/15
5,761,630 A 6/1998 Sekine et al.
(Continued)

FOREIGN PATENT DOCUMENTS

| CN | 1636783 A | 7/2005 |
|---|---|---|
| CN | 1898116 A | 1/2007 |

(Continued)

OTHER PUBLICATIONS

International Search Report for PCT/JP2017/040213 dated Dec. 26, 2017 (partially translated).
(Continued)

*Primary Examiner* — Nicholas Kiswanto
*Assistant Examiner* — Jamal A Shah
(74) *Attorney, Agent, or Firm* — Thomas | Horstemeyer, LLP

(57) ABSTRACT

A vehicle control system includes first and second traveling control units for performing traveling control of controlling driving, braking, and/or steering of a vehicle without depending on a driving operation of a driver. In a case in which control instructions concerning the same actuator conflict between the first traveling control unit and the second traveling control unit, the first traveling control unit arbitrate the control instructions.

10 Claims, 14 Drawing Sheets

(51) Int. Cl.
  *G05D 1/02* (2020.01)
  *B60W 50/00* (2006.01)

(56) References Cited

U.S. PATENT DOCUMENTS

| | | | |
|---|---|---|---|
| 7,412,317 B2 | 8/2008 | Takamatsu et al. | |
| 7,483,778 B2 | 1/2009 | Armbruster et al. | |
| 7,630,800 B2 | 12/2009 | Hirano et al. | |
| 7,630,807 B2 | 12/2009 | Yoshimura et al. | |
| 8,199,046 B2 | 6/2012 | Nanami | |
| 8,358,578 B2 | 1/2013 | Murashige et al. | |
| 8,401,757 B2 | 3/2013 | Tokimasa et al. | |
| 8,442,699 B2 | 5/2013 | Takamatsu et al. | |
| 8,645,022 B2 | 2/2014 | Yoshimura et al. | |
| 9,195,232 B1 * | 11/2015 | Egnor | B60W 10/20 |
| 9,399,472 B2 | 7/2016 | Minoiu-Enache | |
| 9,493,167 B2 | 11/2016 | Okuyama et al. | |
| 9,650,038 B2 | 5/2017 | Yoshimura et al. | |
| 9,783,197 B2 | 10/2017 | Aoki et al. | |
| 9,891,688 B2 | 2/2018 | Armbruster et al. | |
| 9,902,311 B2 | 2/2018 | Sweeney et al. | |
| 9,919,713 B2 | 3/2018 | Sautter | |
| 10,137,875 B2 | 11/2018 | Hecker et al. | |
| 10,691,123 B2 * | 6/2020 | Abe | G05D 1/0061 |
| 10,942,497 B2 | 3/2021 | Yhr | |
| 2005/0143893 A1 | 6/2005 | Takamatsu et al. | |
| 2006/0116803 A1 | 6/2006 | Armbruster et al. | |
| 2007/0150118 A1 | 6/2007 | Takamatsu et al. | |
| 2007/0156310 A1 | 7/2007 | Hirano et al. | |
| 2009/0251355 A1 | 10/2009 | Nanami | |
| 2010/0138123 A1 | 6/2010 | Tokimasa et al. | |
| 2010/0280634 A1 | 11/2010 | Murashige et al. | |
| 2013/0211658 A1 * | 8/2013 | Bonefas | B65G 67/24 701/28 |
| 2014/0188343 A1 | 7/2014 | Yoshimura et al. | |
| 2015/0033054 A1 | 1/2015 | Armbruster et al. | |
| 2015/0134178 A1 | 5/2015 | Minoiu-Enache | |
| 2015/0298626 A1 | 10/2015 | Okuyama et al. | |
| 2016/0288790 A1 | 10/2016 | Aoki et al. | |
| 2017/0028992 A1 | 2/2017 | Sautter | |
| 2017/0212513 A1 | 7/2017 | Iida et al. | |
| 2017/0217436 A1 | 8/2017 | Inomata | |
| 2017/0240098 A1 | 8/2017 | Sweeney et al. | |
| 2017/0267221 A1 | 9/2017 | Hecker et al. | |
| 2018/0046161 A1 | 2/2018 | Yhr | |
| 2018/0050692 A1 | 2/2018 | Kim et al. | |
| 2018/0170374 A1 | 6/2018 | Otsuka et al. | |

FOREIGN PATENT DOCUMENTS

| | | | |
|---|---|---|---|
| CN | 1906061 A | | 1/2007 |
| CN | 101479624 A | | 7/2009 |
| CN | 101909942 A | | 12/2010 |
| CN | 102897165 A | | 1/2013 |
| CN | 106394521 A | | 2/2017 |
| CN | 205940608 U | | 2/2017 |
| DE | 102013020177 A1 | | 6/2014 |
| JP | H8-263793 A | | 10/1996 |
| JP | 2003-015742 A | | 1/2003 |
| JP | 2005-521182 A | | 7/2005 |
| JP | 2006-051922 A | | 2/2006 |
| JP | 2007-253861 A | | 10/2007 |
| JP | 2008-265618 A | | 11/2008 |
| JP | 2009-023487 A | | 2/2009 |
| JP | 2009-137582 A | | 6/2009 |
| JP | 2009137582 A | * | 6/2009 |
| JP | 2009-146203 A | | 7/2009 |
| JP | 2010-132032 A | | 6/2010 |
| JP | 2014-088067 A | | 5/2014 |
| JP | 2016-037077 A | | 3/2016 |
| JP | 2016-080539 A | | 5/2016 |
| JP | 2016131032 A | | 7/2016 |
| JP | 2016-181032 A | | 10/2016 |
| JP | 2016-190519 A | | 11/2016 |
| JP | 2017-047694 A | | 3/2017 |
| JP | 2017-138740 A | | 8/2017 |
| WO | 2016/021340 A1 | | 2/2016 |
| WO | 2016045652 A1 | | 3/2016 |
| WO | 2016/080452 A1 | | 5/2016 |
| WO | 2016156204 A1 | | 10/2016 |
| WO | 2018/154859 A1 | | 8/2018 |
| WO | 2018/154860 A1 | | 8/2018 |
| WO | 2018/154861 A1 | | 8/2018 |
| WO | 2018/154862 A1 | | 8/2018 |

OTHER PUBLICATIONS

International Search Report for PCT/JP2017/040214 dated Feb. 6, 2018 (partially translated).
International Search Report for PCT/JP2017/040211 dated Jan. 23, 2018 (partially translated).
International Search Report for PCT/JP2017/040212 dated Feb. 13, 2018 (partially translated).
File history of related U.S. Appl. No. 16/534,394, filed Aug. 7, 2019.
File history of related U.S. Appl. No. 16/534,448, filed Aug. 7, 2019.
File history of related U.S. Appl. No. 16/534,383, filed Aug. 7, 2019.
Decision to Dismiss the Amendment (issued together with Final Rejection) for Japanese Patent Application No. 2019-501044 dated Mar. 1, 2021.
Japanese Office Action issued for Japanese Patent Application No. 2019-501044 dated Oct. 26, 2020 (with Partial Translation).
Office Action issued for U.S. Appl. No. 16/534,394 dated Mar. 29, 2021.
Office Action issued for U.S. Appl. No. 16/534,448 dated Mar. 17, 2021.
Office Action issued for U.S. Appl. No. 16/534,448 dated Sep. 20, 2021.
Chinese Office Action issued for Chinese Patent Application No. 201780086468.9 dated Jan. 7, 2022.

* cited by examiner

VEHICLE CONTROL SYSTEM AND CONTROL METHOD

CROSS-REFERENCE TO RELATED APPLICATION(S)

This application is a continuation of International Patent Application No. PCT/JP2017/040211 filed on Nov. 8, 2017, which claims priority to and the benefit of Japanese Patent Application No. 2017-032533 filed on Feb. 23, 2017, the entire disclosures of which are incorporated herein by reference.

BACKGROUND OF THE INVENTION

Field of the Invention

The present invention relates to a vehicle control technique.

Description of the Related Art

To improve the reliability of automated driving control of a vehicle, providing of a monitor for a control apparatus (FIG. 11 of WO 2016/080452) and multiplexing of an apparatus (Japanese Patent Laid-Open No. 2003-015742) are proposed.

If multiplexed functions are independently simultaneously operated, the stability of vehicle control may be affected.

SUMMARY OF THE INVENTION

It is an object of the present invention to improve the stability of vehicle control.

According to an aspect of the present invention, there is provided a vehicle control system comprising: a first traveling control unit configured to perform traveling control of controlling driving, braking, and/or steering of a vehicle without depending on a driving operation of a driver; and a second traveling control unit configured to control driving, braking, and/or steering of the vehicle, wherein in a case in which control instructions concerning the same actuator conflict between the first traveling control unit and the second traveling control unit, the first traveling control unit is configured to arbitrate the control instructions.

According to another aspect of the present invention, there is provided a vehicle control system comprising: an input unit configured to accept an instruction input from a driver; a first traveling control unit configured to automatically perform traveling of a vehicle without depending on a driving operation of the driver in a case in which the instruction input from the driver is accepted by the input unit; and a second traveling control unit configured to perform second traveling control of performing traveling support for the vehicle in response to the driving operation of the driver, wherein in a case in which control instructions concerning the same actuator conflict between the first traveling control unit and the second traveling control unit, the first traveling control unit is configured to arbitrate the control instructions.

According to still another aspect of the present invention, there is provided a vehicle control system comprising a plurality of control units, wherein the plurality of control units comprise a traveling control unit configured to automatically perform traveling of a vehicle without depending on a driving operation of a driver, and in a case in which the traveling control unit automatically performs traveling of the vehicle without depending on the driving operation of the driver, at least some functions provided by the control units other than the traveling control unit out of the plurality of control units are limited.

According to still another aspect of the present invention, there is provided a control method comprising: performing traveling control of controlling driving, braking, and/or steering of a vehicle without depending on a driving operation of a driver; controlling driving, braking, and/or steering of the vehicle; and in a case in which control instructions concerning the same actuator conflict between the performing and the controlling, arbitrating the control instructions.

According to still another aspect of the present invention, there is provided a control method of a vehicle control system including a plurality of control units, the method comprising: automatically performing traveling of a vehicle without depending on a driving operation of a driver by a traveling control unit in the plurality of control units; and in a case in which the traveling control unit automatically performs traveling of the vehicle without depending on the driving operation of the driver, limiting at least some functions provided by the control units other than the traveling control unit out of the plurality of control units.

Further features of the present invention will become apparent from the following description of exemplary embodiments (with reference to the attached drawings).

DESCRIPTION OF THE EMBODIMENTS

First Embodiment

Figure 1:
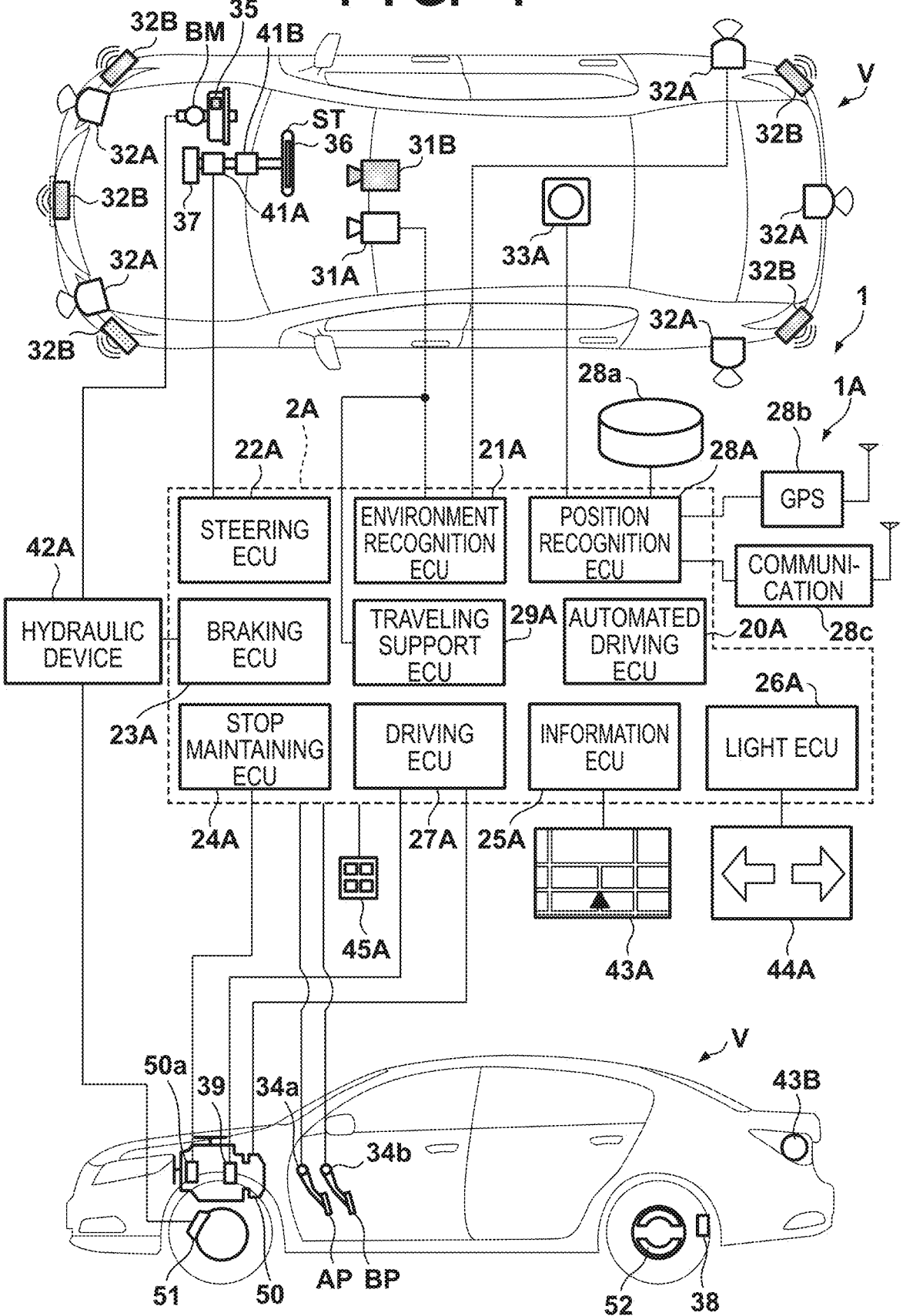
FIG. 1 is a block diagram of a vehicle control system according to an embodiment.
Figure 2:
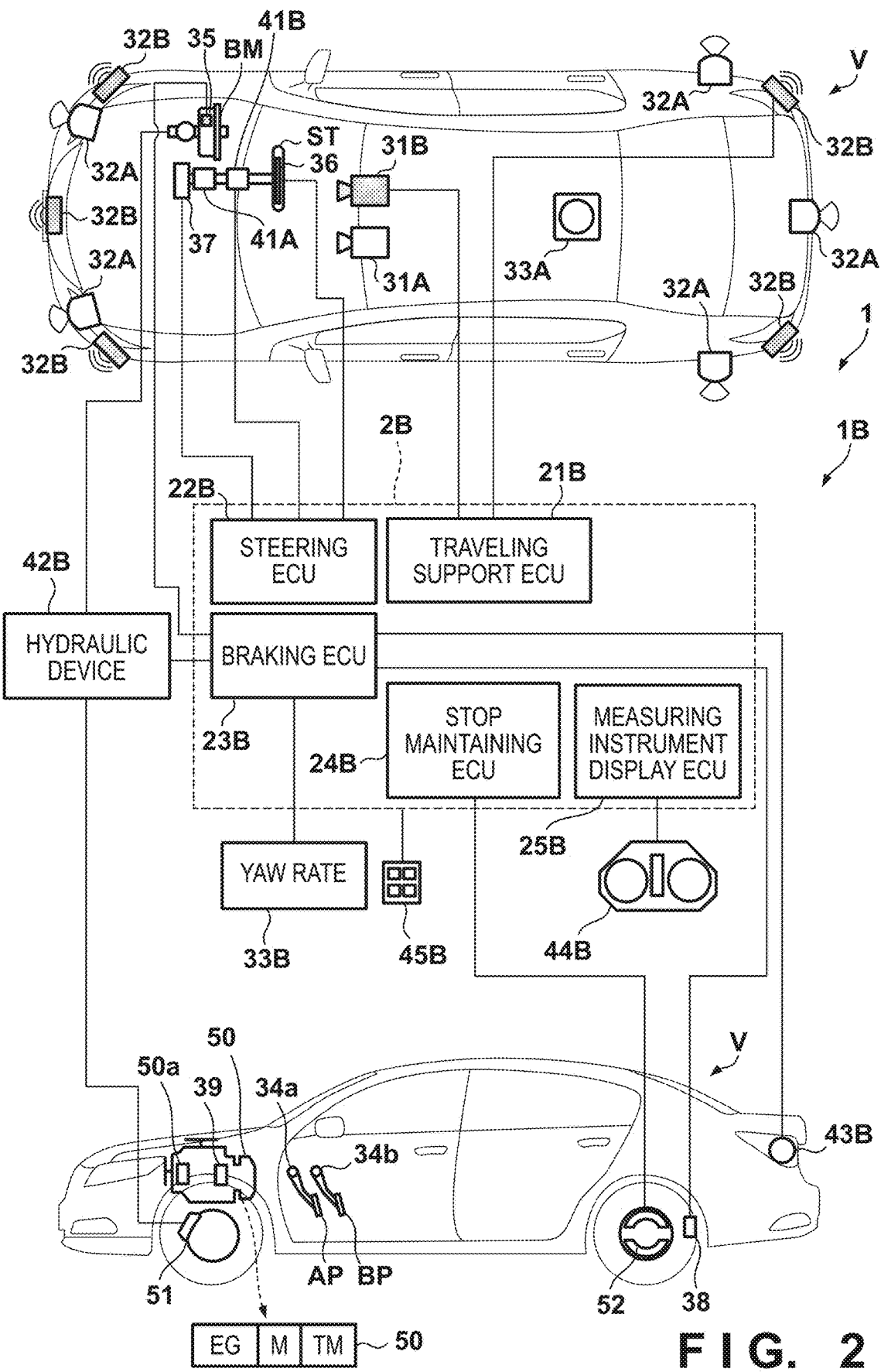
FIG. 2 is a block diagram of the vehicle control system according to the embodiment.
Figure 3:
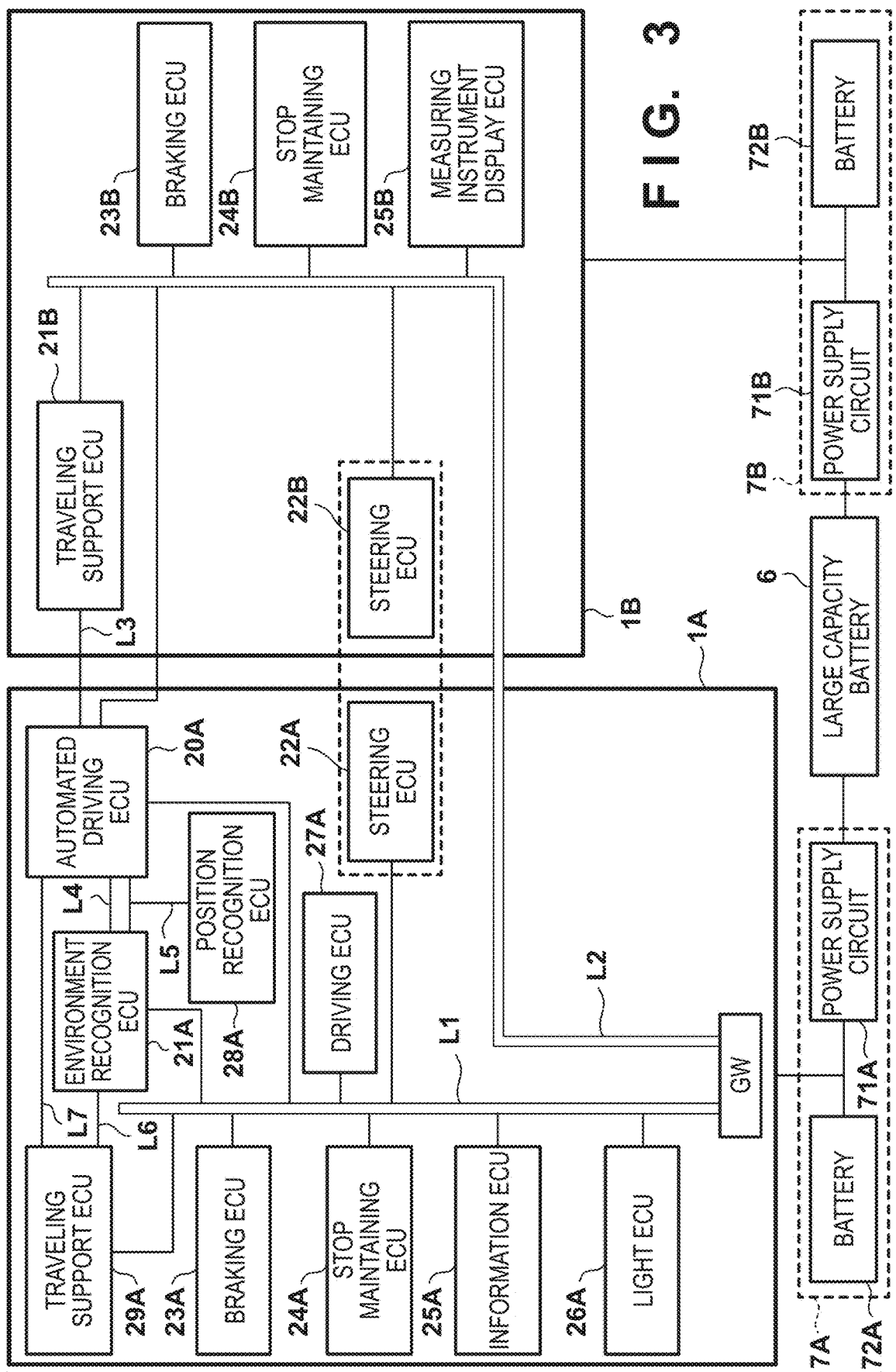
FIG. 3 is a block diagram of the vehicle control system according to the embodiment.

FIGS. 1 to 3 are block diagrams of a vehicle control system 1 according to an embodiment of the present invention. The vehicle control system 1 controls a vehicle V. In each of FIGS. 1 and 2, an outline of the vehicle V is shown in a plan view and a side view. As an example, the vehicle V is a sedan-type four-wheeled vehicle. The vehicle control system 1 includes a control apparatus 1A and a control apparatus 1B. FIG. 1 is a block diagram showing the control apparatus 1A, and FIG. 2 is a block diagram showing the control apparatus 1B. FIG. 3 mainly shows the arrangement of communication lines between the control apparatus 1A and the control apparatus 1B and power supplies.

The control apparatus 1A and the control apparatus 1B make some functions implemented by the vehicle V multiplexed or redundant. This can improve the reliability of the system. The control apparatus 1A performs, for example, not only automated driving control and normal operation control in manual driving but also traveling support control concerning risk avoidance and the like. The control apparatus 1B mainly performs traveling support control concerning risk avoidance and the like. Traveling support will sometimes be referred to as driving support. The control apparatus 1A and the control apparatus 1B are caused to perform different control processes while making the functions redundant, thereby improving the reliability while distributing the control processes.

The vehicle V according to this embodiment is a parallel hybrid vehicle. FIG. 2 schematically shows the arrangement of a power plant 50 that outputs a driving force to rotate the driving wheels of the vehicle V. The power plant 50 includes an internal combustion engine EG, a motor M, and an automatic transmission TM. The motor M is usable as a driving source to accelerate the vehicle V and is also usable as a power generator upon deceleration or the like (regenerative braking).

<Control Apparatus 1A>

The arrangement of the control apparatus 1A will be described with reference to FIG. 1. The control apparatus 1A includes an ECU group (control unit group) 2A. The ECU group 2A includes a plurality of ECUs 20A to 29A. Each ECU includes a processor represented by a CPU, a storage device such as a semiconductor memory, an interface with an external device, and the like. The storage device stores programs to be executed by the processor, data to be used by the processor for processing, and the like. Each ECU may include a plurality of processors, storage devices, and interfaces. Note that the number of ECUs and the provided functions can appropriately be designed, and they can be subdivided or integrated as compared to this embodiment. Note that in FIGS. 1 and 3, the names of the representative functions of the ECUs 20A to 29A are given. For example, the ECU 20A is denoted by "automated driving ECU".

The ECU 20A executes control associated with automated driving as traveling control of the vehicle V. In automated driving, a driving (acceleration of the vehicle V by the power plant 50, and the like), steering, and/or braking of the vehicle V is automatically performed independently of the driving operation of the driver. In this embodiment, driving, steering, and braking are automatically performed.

The ECU 21A is an environment recognition unit configured to recognize the traveling environment of the vehicle V based on the detection results of detection units 31A and 32A that detect the surrounding situation of the vehicle V. The ECU 21A generates target data (to be described later) as surrounding environment information.

In this embodiment, the detection unit 31A is an image capturing device (to be sometimes referred to as the camera 31A hereinafter) configured to detect an object around the vehicle V by image capturing. The camera 31A is provided on the roof front portion of the vehicle V to capture the front side of the vehicle V. When images captured by the camera 31A are analyzed, the contour of a target or a division line (a white line or the like) of a lane on a road can be extracted.

In this embodiment, the detection unit 32A is a lidar (light detection and ranging) (to be sometimes referred to as the lidar 32A hereinafter) configured to detect an object around the vehicle V by light, and detects a target around the vehicle V or measures the distance to a target. In this embodiment, five lidars 32A are provided; one at each corner of the front portion of the vehicle V, one at the center of the rear portion, and one on each side of the rear portion. The number of lidars 32A and their arrangement can appropriately be selected.

The ECU 29A is a traveling support unit configured to execute control associated with traveling support (in other words, driving support) as traveling control of the vehicle V based on the detection result of the detection unit 31A.

The ECU 22A is a steering control unit configured to control an electric power steering device 41A. The electric power steering device 41A includes a mechanism that steers the front wheels in accordance with the driving operation (steering operation) of the driver on a steering wheel ST. The electric power steering device 41A includes a motor that generates a driving force to assist the steering operation or automatically steer the front wheels, a sensor that detects the rotation amount of the motor, a torque sensor that detects the steering torque on the driver, and the like.

The ECU 23A is a braking control unit configured to control a hydraulic device 42A. A braking operation of the driver on a brake pedal BP is converted into a fluid pressure by a brake master cylinder BM and transmitted to the hydraulic device 42A. The hydraulic device 42A is an actuator capable of controlling, based on the fluid pressure transmitted from the brake master cylinder BM, the fluid pressure of hydraulic oil to be supplied to a brake device (for example, a disc brake device) 51 provided in each of the four wheels. The ECU 23A performs driving control of a solenoid valve and the like provided in the hydraulic device 42A. In this embodiment, the ECU 23A and the hydraulic device 42A form an electric servo brake. The ECU 23A controls, for example, the distribution of a braking force by the four brake devices 51 and a braking force by regenerative braking of the motor M.

The ECU 24A is a stop maintaining control unit configured to control an electric parking lock device 50a provided in the automatic transmission TM. The electric parking lock device 50a includes a mechanism that mainly locks the internal mechanism of the automatic transmission TM when the P range (parking range) is selected. The ECU 24A can control lock and unlock by the electric parking lock device 50a.

The ECU 25A is an in-vehicle notification control unit configured to control an information output device 43A that notifies information in the vehicle. The information output device 43A includes, for example, a display device such as a head-up display and a voice output device. The information output device 43A may further include a vibration device. The ECU 25A causes the information output device 43A to output, for example, various kinds of information such as a vehicle speed and an atmospheric temperature and information such as a path guidance.

The ECU 26A is an external notification control unit configured to control an information output device 44A that notifies information outside the vehicle. In this embodiment, the information output device 44A is a direction indicator (hazard lamp). The ECU 26A controls blinking of the information output device 44A serving as a direction indicator, thereby notifying the exterior of the vehicle of the advancing direction of the vehicle V. In addition, the ECU 26A controls blinking of the information output device 44A serving as a hazard lamp, thereby increasing the attention of the exterior to the vehicle V.

The ECU 27A is a driving control unit configured to control the power plant 50. In this embodiment, one ECU 27A is assigned to the power plant 50. However, one ECU may be assigned to each of the internal combustion engine EG, the motor M, and the automatic transmission TM. The ECU 27A controls the output of the internal combustion engine EG or the motor M or switches the gear range of the automatic transmission TM in correspondence with, for example, the driving operation of the driver detected by an operation detection sensor 34$a$ provided on an accelerator pedal AP or an operation detection sensor 34$b$ provided on the brake pedal BP, the vehicle speed, or the like. Note that as a sensor that detects the traveling state of the vehicle V, a rotation speed sensor 39 that detects the rotation speed of the output shaft of the automatic transmission TM is provided in the automatic transmission TM. The vehicle speed of the vehicle V can be calculated from the detection result of the rotation speed sensor 39.

The ECU 28A is a position recognition unit configured to recognize the current position or the route of the vehicle V. The ECU 28A performs control of a gyro sensor 33A, a GPS sensor 28$b$, and a communication device 28$c$ and information processing of a detection result or a communication result. The gyro sensor 33A detects the rotary motion of the vehicle V. The route of the vehicle V can be determined based on the detection result of the gyro sensor 33A, and the like. The GPS sensor 28$b$ detects the current position of the vehicle V. The communication device 28$c$ performs wireless communication with a server configured to provide map information and traffic information, and acquires these pieces of information. A database 28$a$ can store accurate map information. The ECU 28A can more accurately specify the position of the vehicle V on a lane based on the map information and the like.

An input device 45A is arranged in the vehicle such that the driver can operate it, and accepts input of an instruction or information from the driver.

<Control Apparatus 1B>

The arrangement of the control apparatus 1B will be described with reference to FIG. 2. The control apparatus 1B includes an ECU group (control unit group) 2B. The ECU group 2B includes a plurality of ECUs 21B to 25B. Each ECU includes a processor represented by a CPU, a storage device such as a semiconductor memory, an interface with an external device, and the like. The storage device stores programs to be executed by the processor, data to be used by the processor for processing, and the like. Each ECU may include a plurality of processors, storage devices, and interfaces. Note that the number of ECUs and the provided functions can appropriately be designed, and they can be subdivided or integrated as compared to this embodiment. Note that in FIGS. 2 and 3, the names of the representative functions of the ECUs 21B to 25B are given, like the ECU group 2A.

The ECU 21B is an environment recognition unit configured to recognize the traveling environment of the vehicle V based on the detection results of detection units 31B and 32B that detect the surrounding situation of the vehicle V, and also serves as a traveling support unit configured to execute control associated with traveling support (in other words, driving support) as traveling control of the vehicle V. The ECU 21B generates target data (to be described later) as surrounding environment information.

Note that in this embodiment, the ECU 21B has the environment recognition function and the traveling support function. However, an ECU may be provided for each function, like the ECU 21A and the ECU 29A of the control apparatus 1A. Reversely, in the control apparatus 1A, the functions of the ECU 21A and the ECU 29A may be implemented be one ECU, like the ECU 21B.

In this embodiment, the detection unit 31B is an image capturing device (to be sometimes referred to as the camera 31B hereinafter) configured to detect an object around the vehicle V by image capturing. The camera 31B is provided on the roof front portion of the vehicle V to capture the front side of the vehicle V. When images captured by the camera 31B are analyzed, the contour of a target or a division line (a white line or the like) of a lane on a road can be extracted. In this embodiment, the detection unit 32B is a millimeter wave radar (to be sometimes referred to as the radar 32B hereinafter) configured to detect an object around the vehicle V by a radio wave, and detects a target around the vehicle V or measures the distance to a target. In this embodiment, five radars 32B are provided; one at the center of the front portion of the vehicle V, one at each corner of the front portion, and one at each corner of the rear portion. The number of radars 32B and their arrangement can appropriately be selected.

The ECU 22B is a steering control unit configured to control the electric power steering device 41B. The electric power steering device 41B includes a mechanism that steers the front wheels in accordance with the driving operation (steering operation) of the driver on the steering wheel ST. The electric power steering device 41B includes a motor that generates a driving force to assist the steering operation or automatically steer the front wheels, a sensor that detects the rotation amount of the motor, a torque sensor that detects the steering torque on the driver, and the like. In addition, a steering angle sensor 37 is electrically connected to the ECU 22B through a communication line L2 to be described later, and the electric power steering device 41B can be controlled based on the detection result of the steering angle sensor 37. The ECU 22B can acquire the detection result of a sensor 36 that detects whether the driver is gripping the steering handle ST, and can monitor the gripping state of the driver.

The ECU 23B is a braking control unit configured to control a hydraulic device 42B. A braking operation of the driver on the brake pedal BP is converted into a fluid pressure by the brake master cylinder BM and transmitted to the hydraulic device 42B. The hydraulic device 42B is an actuator capable of controlling, based on the fluid pressure transmitted from the brake master cylinder BM, the fluid pressure of hydraulic oil to be supplied to the brake device 51 of each wheel. The ECU 23B performs driving control of a solenoid valve and the like provided in the hydraulic device 42B.

In this embodiment, a wheel speed sensor 38 provided in each of the four wheels, a yaw rate sensor 33B, and a pressure sensor 35 configured to detect the pressure in the brake master cylinder BM are electrically connected to the ECU 23B and the hydraulic device 42B, and based on the detection results of these, an ABS function, traction control, and the posture control function for the vehicle V are implemented. For example, the ECU 23B adjusts the braking force of each wheel based on the detection result of the wheel speed sensor 38 provided in each of the four wheels, thereby suppressing skid of each wheel. In addition, the ECU 23B adjusts the braking force of each wheel based on the rotation angular speed about the vertical axis of the vehicle V detected by the yaw rate sensor 33B, thereby suppressing an abrupt posture change of the vehicle V.

The ECU 23B also functions as an external notification control unit configured to control an information output device 43B that notifies information outside the vehicle. In this embodiment, the information output device 43B is a brake lamp, and the ECU 23B can light the brake lamp at the time of braking or the like. This can increase the attention of a following vehicle to the vehicle V.

The ECU 24B is a stop maintaining control unit configured to control an electric parking brake device (for example, a drum brake) 52 provided in each rear wheel. The electric parking brake device 52 includes a mechanism that locks the rear wheel. The ECU 24B can control lock and unlock of the rear wheels by the electric parking brake devices 52.

The ECU 25B is an in-vehicle notification control unit configured to control an information output device 44B that notifies information in the vehicle. In this embodiment, the information output device 44B includes a display device arranged on the instrument panel. The ECU 25B can cause the information output device 44B to output various kinds of information such as a vehicle speed and fuel consumption.

An input device 45B is arranged in the vehicle such that the driver can operate it, and accepts input of an instruction or information from the driver.

<Communication Lines>

An example of communication lines of the control system 1, which communicably connect the ECUs, will be described with reference to FIG. 3. The control system 1 includes communication lines L1 to L7 of wired communication. The ECUs 20A to 27A and 29A of the control apparatus 1A are connected to the communication line L1. Note that the ECU 28A may also be connected to the communication line L1.

The ECUs 21B to 25B of the control apparatus 1B are connected to the communication line L2. The ECU 20A of the control apparatus 1A is also connected to the communication line L2. The communication line L3 connects the ECU 20A and the ECU 21B. The communication line L5 connects the ECU 20A, the ECU 21A, and the ECU 28A. The communication line L6 connects the ECU 29A and the ECU 21A. The communication line L7 connects the ECU 29A and the ECU 20A.

The protocols of the communication lines L1 to L7 may be identical or different, and may be changed in accordance with the communication environment such as a communication speed, a communication amount, and durability. For example, the communication lines L3 and L4 may be Ethernet® from the viewpoint of communication speed. For example, the communication lines L1, L2, and L5 to L7 may be CAN.

The control apparatus 1A includes a gateway GW. The gateway GW relays the communication line L1 and the communication line L2. For this reason, for example, the ECU 21B can output a control instruction to the ECU 27A through the communication line L2, the gateway GW, and the communication line L1.

<Power Supply>

The power supply of the control system 1 will be described with reference to FIG. 3. The control system 1 includes a large capacity battery 6, a power supply 7A, and a power supply 7B. The large capacity battery 6 is a battery used to drive the motor M and charged by the motor M.

The power supply 7A is a power supply that supplies power to the control apparatus 1A, and includes a power supply circuit 71A and a battery 72A. The power supply circuit 71A is a circuit that supplies the power of the large capacity battery 6 to the control apparatus 1A, and, for example, lowers the output voltage (for example, 190 V) of the large capacity battery 6 to a reference voltage (for example, 12 V). The battery 72A is a lead battery of, for example, 12 V. Since the battery 72A is provided, the power can be supplied to the control apparatus 1A even in a case in which the power supply of the large capacity battery 6 or the power supply circuit 71A is shut down or lowers.

The power supply 7B is a power supply that supplies power to the control apparatus 1B, and includes a power supply circuit 71B and a battery 72B. The power supply circuit 71B is a circuit that is similar to the power supply circuit 71A and supplies the power of the large capacity battery 6 to the control apparatus 1B. The battery 72B is a battery similar to the battery 72A, and is a lead battery of, for example, 12 V. Since the battery 72B is provided, the power can be supplied to the control apparatus 1B even in a case in which the power supply of the large capacity battery 6 or the power supply circuit 71B is shut down or lowers.

<Redundancy>

Functions common to the control apparatus 1A and the control apparatus 1B will be described. When the same functions are made redundant, the reliability of the control system 1 can be improved. In addition, some redundant functions provide different functions, instead of multiplexing the same functions. This suppresses an increase in cost caused by the redundancy of functions.

[Actuator System]

Steering

The control apparatus 1A includes the electric power steering device 41A and the ECU 22A that controls this. The control apparatus 1B also includes the electric power steering device 41B and the ECU 22B that controls this.

Braking

The control apparatus 1A includes the hydraulic device 42A and the ECU 23A that controls this. The control apparatus 1B includes the hydraulic device 42B and the ECU 23B that controls this. All of these can be used for braking of the vehicle V. On the other hand, the main function of the braking mechanism of the control apparatus 1A is the distribution of the braking force by the brake device 51 and the braking force by the regenerative braking of the motor M. On the other hand, the main function of the braking mechanism of the control apparatus 1B is posture control and the like. Although the functions are common concerning braking, functions different from each other are provided.

Stop Maintaining

The control apparatus 1A includes the electric parking lock device 50a and the ECU 24A that controls this. The control apparatus 1B includes the electric parking brake device 52 and the ECU 24B that controls this. All of these can be used to maintain the stop of the vehicle V. On the other hand, although the electric parking lock device 50a is a device that functions when the P range of the automatic transmission TM is selected, the electric parking brake device 52 is a device that locks a rear wheel. Although the functions are common concerning stop maintaining of the vehicle V, functions different from each other are provided.

In-Vehicle Notification

The control apparatus 1A includes the information output device 43A and the ECU 25A that controls this. The control apparatus 1B includes the information output device 44B and the ECU 25B that controls this. All of these can be used to notify the driver of information. On the other hand, the information output device 43A is, for example, a head-up display, and the information output device 44B is a display device such as a measuring instrument. Although the functions are common concerning in-vehicle notification, display devices different from each other can be employed.

External Notification

The control apparatus 1A includes the information output device 44A and the ECU 26A that controls this. The control apparatus 1B includes the information output device 43B and the ECU 23B that controls this. All of these can be used to notify information outside the vehicle. On the other hand, the information output device 44A is a direction indicator (hazard lamp), and the information output device 43B is a brake lamp. Although the functions are common concerning external notification, functions different from each other are provided.

Different Points

The control apparatus 1A includes the ECU 27A that controls the power plant 50. However, the control apparatus 1B does not include a unique ECU that controls the power plant 50. In this embodiment, both the control apparatuses 1A and 1B can solely perform steering, braking, and stop maintaining. Hence, even if the control apparatus 1A or control apparatus 1B suffers performance degradation, power supply shutdown, or communication interruption, it is possible to decelerate and maintain the stop state while suppressing lane departure. Additionally, as described above, the ECU 21B can output a control instruction to the ECU 27A through the communication line L2, the gateway GW, and the communication line L1, and the ECU 21B can also control the power plant 50. Since the control apparatus 1B does not include a unique ECU that controls the power plant 50, an increase in cost can be suppressed. However, the control apparatus 1B may include a unique ECU.

[Sensor System]

Detection of Surrounding Situation

The control apparatus 1A includes the detection units 31A and 32A. The control apparatus 1B includes the detection units 31B and 32B. All of these can be used to recognize the traveling environment of the vehicle V. On the other hand, the detection unit 32A is a lidar, and the detection unit 32B is a radar. The lidar is generally advantageous in detecting a shape. Additionally, the radar is generally more advantageous than the lidar from the viewpoint of cost. When these sensors of different characteristics are used, it is possible to improve target recognition performance and reduce the cost. Both the detection units 31A and 31B are cameras. Cameras of different characteristics may be used. For example, one of them may be a camera of a resolution higher than the other. In addition, the angles of view may be different from each other.

As for comparison of the control apparatus 1A and the control apparatus 1B, the detection characteristics of the detection units 31A and 32A may be different from those of the detection units 31B and 32B. In this embodiment, the detection unit 32A is a lidar whose target edge detection performance is higher than that of the radar (detection unit 32B) in general. Additionally, the radar is generally excellent in the relative speed detection accuracy or weatherability as compared to the lidar.

In addition, if the camera 31A has a resolution higher than that of the camera 31B, the detection performance of the detection units 31A and 32A is higher than that of the detection units 31B and 32B. When the plurality of sensors of different detection characteristics and costs are combined, cost advantage can sometimes be obtained in the whole system. In addition, when the sensors of different detection characteristics are combined, detection omission or detection errors can be reduced as compared to a case in which redundancy is attained by identical sensors.

Vehicle Speed

The control apparatus 1A includes the rotation speed sensor 39. The control apparatus 1B includes the wheel speed sensor 38. Both can be used to detect the vehicle speed. On the other hand, the rotation speed sensor 39 detects the rotation speed of the output shaft of the automatic transmission TM, and the wheel speed sensor 38 detects the rotation speed of the wheels. Although the sensors are common concerning the capability of detecting the vehicle speed, the detection targets are different from each other.

Yaw Rate

The control apparatus 1A includes the gyro 33A. The control apparatus 1B includes the yaw rate sensor 33B. Both can be used to detect the angular velocity about the vertical axis of the vehicle V. On the other hand, the gyro 33A is used to determine the route of the vehicle V, and the yaw rate sensor 33B is used for posture control of the vehicle V, and the like. Although the sensors are common concerning the capability of detecting the angular velocity of the vehicle V, the use purposes are different from each other.

Steering Angle and Steering Torque

The control apparatus 1A includes a sensor that detects the rotation amount of the motor of the electric power steering device 41A. The control apparatus 1B includes the steering angle sensor 37. Both can be used to detect the steering angle of the front wheels. In the control apparatus 1A, an increase in cost can be suppressed by using the sensor that detects the rotation amount of the motor of the electric power steering device 41A, instead of additionally providing the steering angle sensor 37. However, the steering angle sensor 37 may additionally be provided in the control apparatus 1A.

In addition, when both the electric power steering devices 41A and 41B include torque sensors, the steering torque can be recognized in both the control apparatuses 1A and 1B.

Braking Operation Amount

The control apparatus 1A includes the operation detection sensor 34b. The control apparatus 1B includes the pressure sensor 35. Both can be used to detect the braking operation amount of the driver. On the other hand, the operation detection sensor 34b is used to control the distribution of the braking force by the four brake devices 51 and the braking force by regenerative braking of the motor M, and the pressure sensor 35 is used for posture control and the like. Although the sensors are common concerning detection of the braking operation amount, the use purposes are different from each other.

[Power Supply]

The control apparatus 1A receives power supply from the power supply 7A, and the control apparatus 1B receives power supply from the power supply 7B. Since the power is supplied to any one of the control apparatuses 1A and 1B even in a case in which the power supply of one of the power supply 7A and the power supply 7B is shut down or lowers, it is possible to more reliably ensure the power supply and improve the reliability of the control system 1. If the power supply of the power supply 7A is shut down or lowers, it is difficult to perform communication between the ECUs through the gateway GW provided in the control apparatus 1A. However, in the control apparatus 1B, the ECU 21B can communicate with the ECUs 22B to 24B and the information output device 44B through the communication line L2.

[Redundancy in Control Apparatus 1A]

The control apparatus 1A includes the ECU 20A that performs automated driving control, and the ECU 29A that performs traveling support control. That is, the control apparatus 1A includes two control units configured to perform traveling control.

<Examples of Control Functions>

Control functions executable by the control apparatus 1A or 1B include traveling-associated functions associated with control of driving, braking, and steering of the vehicle V, and notification functions associated with a notification of information to the driver.

Examples of traveling-associated functions are lane maintaining control, lane departure suppression control (lane deviation suppression control), lane change control, preceding vehicle follow-up control, collision reduction brake control, and erroneous start suppression control. Examples of the notification functions are adjacent vehicle notification control and preceding vehicle start notification control.

Figure 14A:
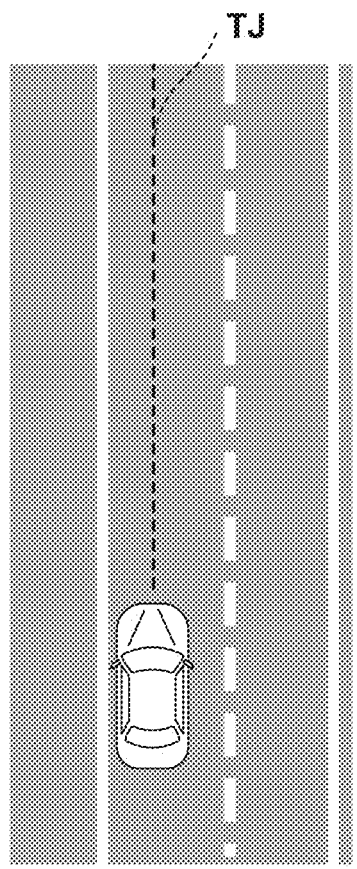
FIG. 14A is an explanatory view showing an example of traveling control.
Figure 14B:
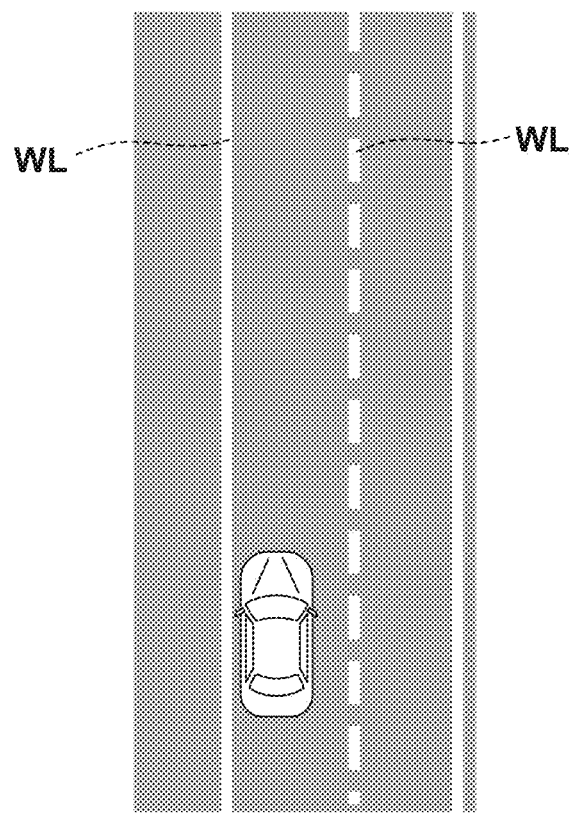
FIG. 14B is an explanatory view showing an example of traveling control.

Lane maintaining control is one of control processes for the position of the vehicle with respect to a lane. As schematically shows in FIG. 14A, this control makes the vehicle travel automatically (without depending on the driving operation of the driver) on a traveling track TJ set in a lane. Lane departure suppression control is one of control processes for the position of the vehicle with respect to a lane. As schematically shows in FIG. 14B, a white line or a median strip WL is detected, and steering is automatically performed so the vehicle does not pass across the line WL. As described above, lane departure suppression control and lane maintaining control are different functions.

Lane change control is control of automatically moving the vehicle from the lane on which the vehicle is traveling to an adjacent lane. Preceding vehicle follow-up control is control of automatically following another vehicle traveling ahead of the self-vehicle. Collision reduction brake control is control of automatically braking the vehicle and supporting collision avoidance in a case in which the possibility of collision against an obstacle ahead of the vehicle rises. Erroneous start suppression control is control of limiting acceleration of the vehicle in a vehicle stop state in a case in which the acceleration operation by the driver is a predetermined amount or more, and suppresses abrupt start.

Adjacent vehicle notification control is control of notifying the driver of the presence of another vehicle traveling on the adjacent lane adjacent to the traveling lane of the self-vehicle. The driver is notified of, for example, the presence of another vehicle traveling on a side or on a rear side of the self-vehicle. Preceding vehicle start notification control is control of notifying that the self-vehicle and another vehicle ahead are in a stop state, and another vehicle ahead has started. These notifications can be made by the above-described in-vehicle notification devices (the information output device 43A and the information output device 44B).

The ECU 20A, the ECU 29A, and the ECU 21B can share and execute these functions. Which control function is to be assigned to which ECU can appropriately be selected.

<Example of Control>
<Mode Switching>

Figure 4:
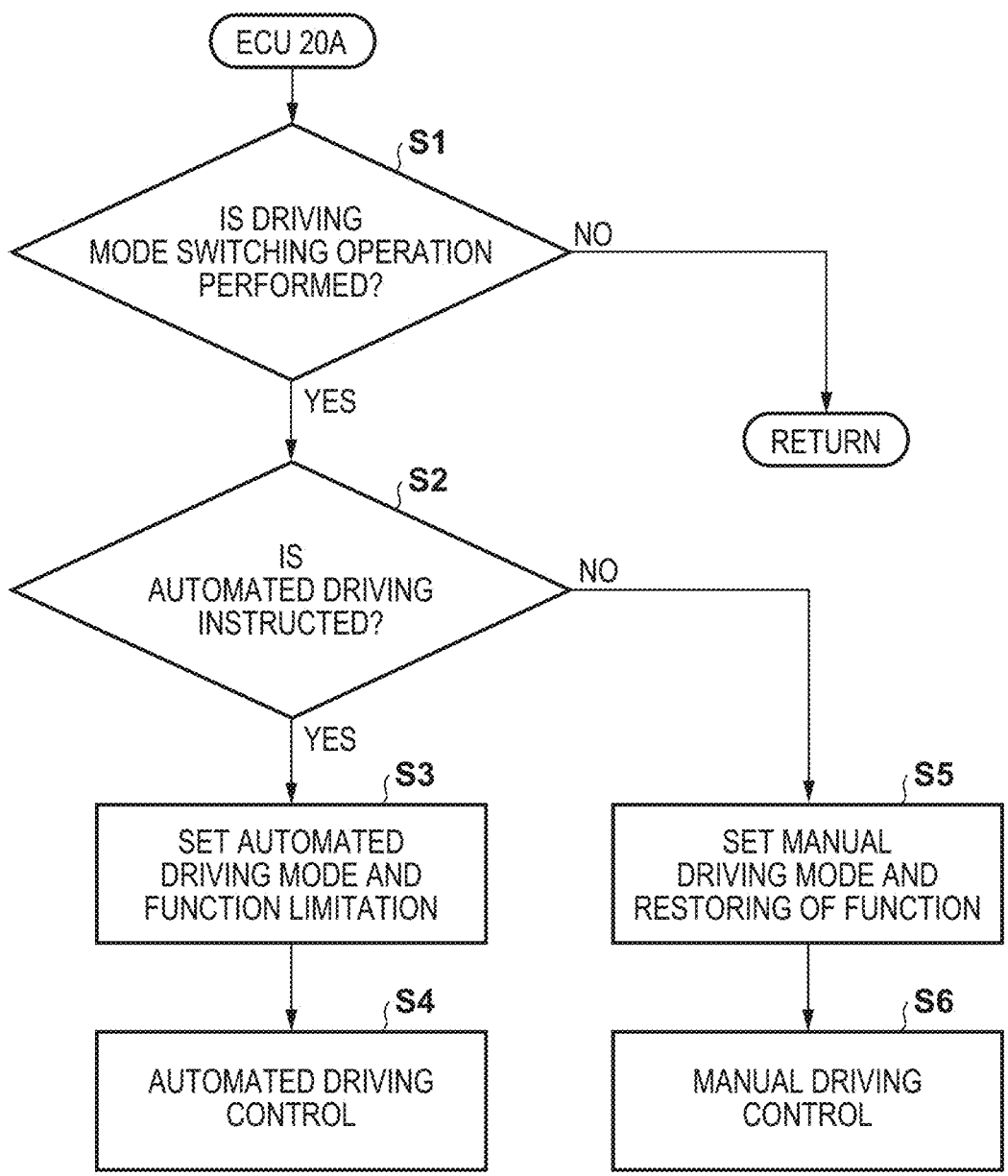
FIG. 4 is a flowchart showing an example of processing executed by the system according to the embodiment.

An example of control of the control system 1 will be described. FIG. 4 is a flowchart showing driving mode switching processing executed by the ECU 20A.

In step S1, it is determined whether a driving mode switching operation is performed by the driver. The driver can input a switching instruction between an automated driving mode and a manual driving mode by, for example, an operation on the input device 45A. If the switching operation is performed, the process advances to step S2. Otherwise, the processing is ended.

In step S2, it is determined whether the switching operation instructs automated driving. If the switching operation instructs automated driving, the process advances to step S3. If the switching operation instructs manual driving, the process advances to step S5. In step S3, the automated driving mode is set, and a function limitation is set. The setting of the function limitation will be described later. In step S4, automated driving control is started. In step S5, the manual driving mode is set, and restoring of the function limited in step S3 is set. In step S6, manual driving control is started.

In manual driving control, driving, steering, and braking of the vehicle V are performed in accordance with the driving operation of the driver. At this time, the ECU 29A can appropriately execute driving support control in accordance with the detection result of the detection unit 31A. In addition, the ECU 21B can appropriately execute driving support control in accordance with the detection results of the detection units 31B and 32B.

In automated driving control, the ECU 20A outputs a control instruction to the ECUs 22A, 23A, and 27A to control steering, braking, and driving of the vehicle V, thereby causing the vehicle V to automatically travel without depending on the driving operation of the driver. The ECU 20A sets the traveling path of the vehicle V, and causes the vehicle V to travel along the set traveling path by referring to the position recognition result of the ECU 28A or surrounding environment information (target detection result).

An example of sharing by the ECU 20A, the ECU 29A, and the ECU 21B concerning the above-described functions in the manual driving mode and the automated driving mode will be described.

For example, in the manual driving mode, the ECU 29A performs collision reduction brake control and erroneous start suppression control based on the detection result of the detection unit 31A. In addition, the ECU 21B performs lane departure suppression control, adjacent vehicle notification control, and preceding vehicle start notification control based on the detection results of the detection units 31B and 32B.

In the automated driving mode, the ECU 20A executes lane maintaining control, lane change control, preceding vehicle follow-up control, and collision reduction brake control. In addition, the ECU 29A executes collision reduction brake control and erroneous start suppression control. When each of the ECU 20A and the ECU 29A executes the collision reduction brake control, the safety can be improved.

If the control functions performed in the manual driving mode are executed in the automated driving mode as well, in some cases, similar functions interfere, or a meaningless function is executed. The function limitation in step S3 and the function restoring in step S5 described above are processes associated with the function limitation and restoring of the ECU 29A or the ECU 21B. In these processes, the ECU 20A can transmit a function limitation instruction or a function restoring instruction of the ECU 29A or the ECU 21B, and the ECU 29A or the ECU 21B complies with the instruction.

For example, if lane change control is executed during the automated driving mode to do steering in a predetermined direction, and a steering instruction in the reverse direction is generated by an intervention of lane departure suppression control, control processes interfere. Hence, the lane departure suppression control is preferably limited during execution of the lane change control. In addition, since the start is automated during the automated driving mode, the necessity of the preceding vehicle start notification control is low. Hence, for such a control function, function limitation is set together with the setting of the automated driving mode. This can improve the safety of vehicle control.

On the other hand, the collision reduction brake control and the erroneous start suppression control function even in the automated driving mode, thereby contributing to the improvement of the safety. Such control functions can function without being limited after the setting of the automated driving mode.

The function limitation may disable the control function, or may reduce the effect while keeping the function enabled. In addition, the control function limitation may be switched without depending on whether the mode is the automated driving mode or not but in accordance with individual control contents during the automated driving mode. For example, in a case in which the vehicle is changing the lane under the lane change control, the system side executes the lane change by analyzing the positional relationship with respect to other vehicles on the adjacent lane. For this reason, an implication of notifying the driver of the other vehicles on the adjacent lane is small. Hence, during the lane change control, the adjacent vehicle notification control may be limited.

<Recognition of Target>

Figure 5:
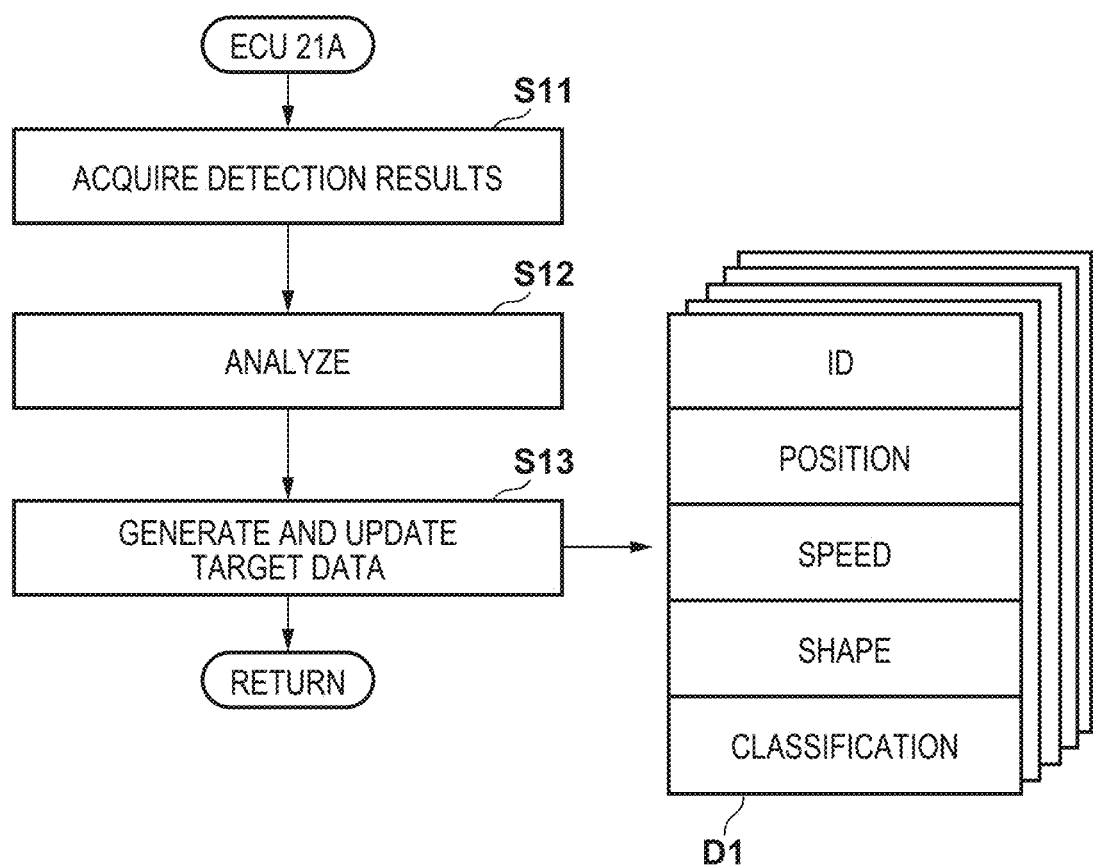
FIG. 5 is a flowchart showing an example of processing executed by the system according to the embodiment.
Figure 6:
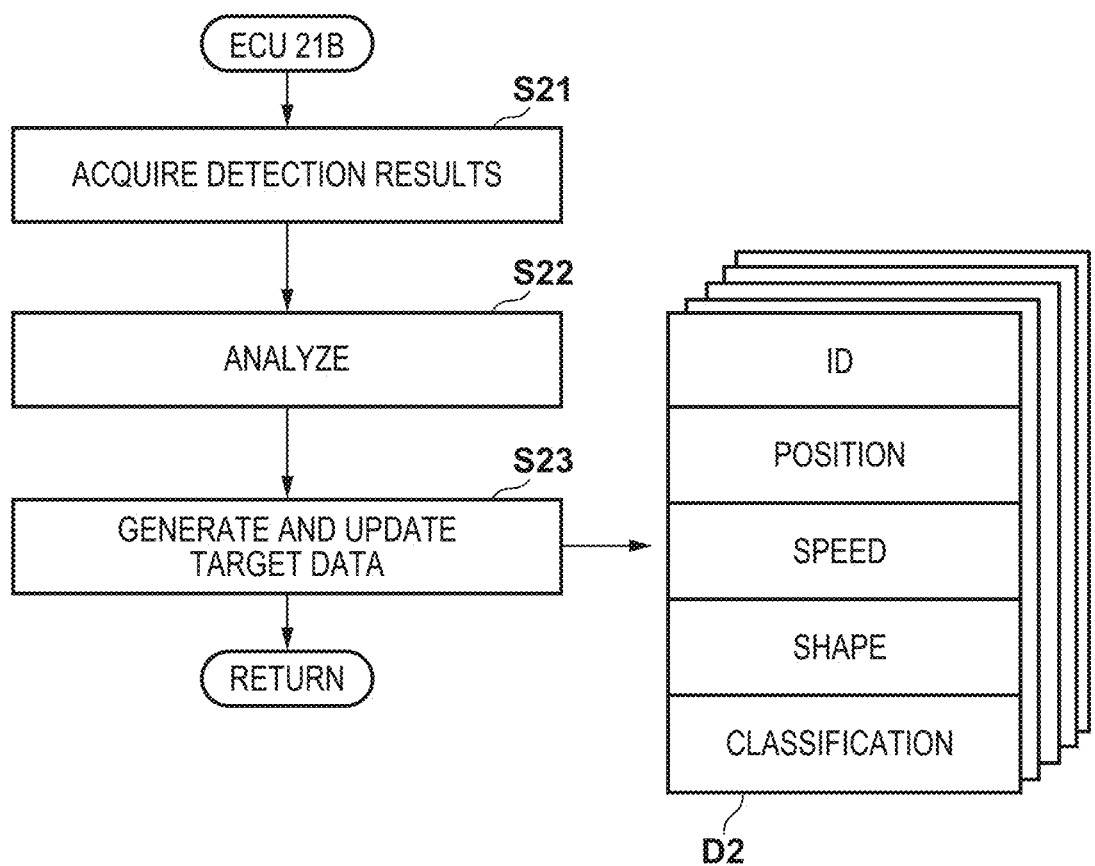
FIG. 6 is a flowchart showing an example of processing executed by the system according to the embodiment.
Figure 7:
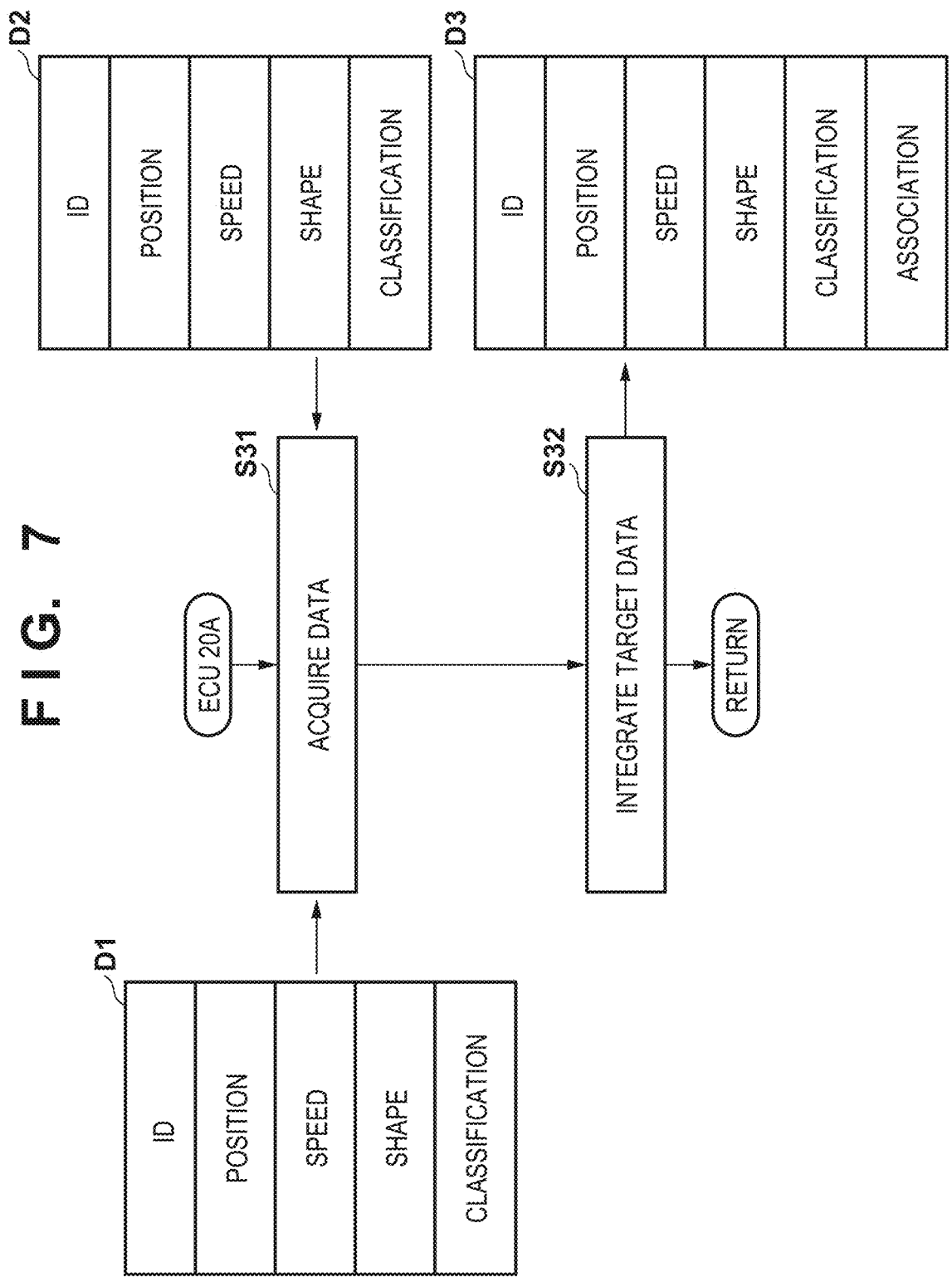
FIG. 7 is a flowchart showing an example of processing executed by the system according to the embodiment.

When the vehicle V is caused to travel on the traveling track TJ by automated driving control, recognition of a target is important. As the detection result of a target, target data obtained by integrating the detection results of the detection units 31A and 32A and the detection results of the detection units 31B and 32B can be used. FIGS. 5 to 7 show an example of processing associated with generation of target data.

FIG. 5 shows target data generation/updating processing periodically executed by the ECU 21A. In step S11, the detection results of the detection units 31A and 32A are acquired. In step S12, the detection results acquired in step S11 are analyzed to recognize individual targets. In step S13, target data is generated or updated. The ECU 21A stores target data D1 generated by it in an internal storage device and independently manages the target data D1. The target data D1 is generated for each target. If a target is recognized as an existing target in step S12, the contents of the corresponding target data D1 that is stored are updated as needed. If a target is recognized as a new target in step S12, corresponding target data D1 is newly generated.

The exemplified target data D1 includes an ID assigned to each target, position information of the target, the information of the moving speed of the target, the information of the shape of the target, and the classification of the target (fixed object, moving object, or the like).

FIG. 6 shows target data generation/updating processing periodically executed by the ECU 21B. The processing is basically similar to the processing of the ECU 21A. In step S21, the detection results of the detection units 31B and 32B are acquired. In step S22, the detection results acquired in step S21 are analyzed to recognize individual targets. In step S23, target data is generated or updated. Even the ECU 21B stores target data D2 generated by it in an internal storage device and independently manages the target data D2. The target data D2 is generated for each target. If a target is recognized as an existing target in step S22, the contents of the corresponding target data D2 that is stored are updated as needed. If a target is recognized as a new target in step S22, corresponding target data D2 is newly generated.

The exemplified target data D2 has a structure similar to that of the target data D1, and includes an ID assigned to each target, position information of the target, the information of the moving speed of the target, the information of the shape of the target, and the classification of the target. In the target data D1 and the target data D2, the items of information may be the same or may be different, as in this embodiment.

FIG. 7 shows target data integration processing periodically executed by the ECU 20A. The ECU 20A generates target data D3 that integrates the target data D1 and the target data D2, and executes control based on the target data D3 at the time of automated driving control.

In step S31, the target data D1 is acquired from the ECU 21A, and the target data D2 is acquired from the ECU 21B. In step S32, the target data D1 and the target data D2 acquired in step S31 are integrated to generate the target data D3. The target data D3 is stored in an internal storage device and independently managed. Note that if the target data D1 and the target data D2 acquired in step S31 are existing targets, the contents of the corresponding target data D3 that is stored are updated as needed.

The exemplified target data D3 has a structure similar to that of the target data D1 and D2, and includes an ID assigned to each target, position information of the target, the information of the moving speed of the target, the information of the shape of the target, the classification of the target, and the information of association. The information of association is information representing the target data D1 and D2 corresponding to the target data D3, and is, for example, the information of each ID in the target data D1 and D2.

When integrating the target data D1 and D2, if one of the data is missing concerning the information of the same item, the other data is used as the information for the target data D3. If the pieces of information in the target data D1 and D2 conflict, for example, one of them can be preferred. The target data D1 is based on the detection results of the camera 31A and the lidar 32A, and the target data D2 is based on the detection results of the camera 31B and the radar 32B. For this reason, the data are different in the accuracy and the characteristic. Hence, which one of the data should be preferred may be determined for each item, and one of the data may be preferred. As another example, the average value of data in the target data D1 and D2 may be calculated, or a weighted value may be employed. That is, a newly calculated value or information may be used.

When the automated driving control is executed based on the target data D3 generated in the above-described way, more reliable control can be executed concerning recognition of a traveling environment.

<Avoidance of Conflict of Control Instructions>

Concerning sharing of the control functions, when the sharing example and the limitation example described above are employed, for example, in the automated driving mode, each of the ECU 29A and the ECU 20A executes the collision reduction brake control. This may cause conflict of the control instructions. For example, in some cases, if the ECU 29A transmits a control instruction to the ECU 23A based on the detection result of the detection unit 31A, and executes braking by operating the hydraulic device 42A, and the ECU 20A transmits a control instruction to the ECU 23A based on the target data D3, and executes braking by operating the hydraulic device 42A, the control instructions conflict.

In this embodiment, the ECU 20A arbitrates the conflicting control instructions, thereby avoiding the conflict of the control instructions. This can improve the safety of vehicle control. A case of collision reduction brake control will be exemplified below. This can also be applied to the control instructions of other control processes.

Figure 8:
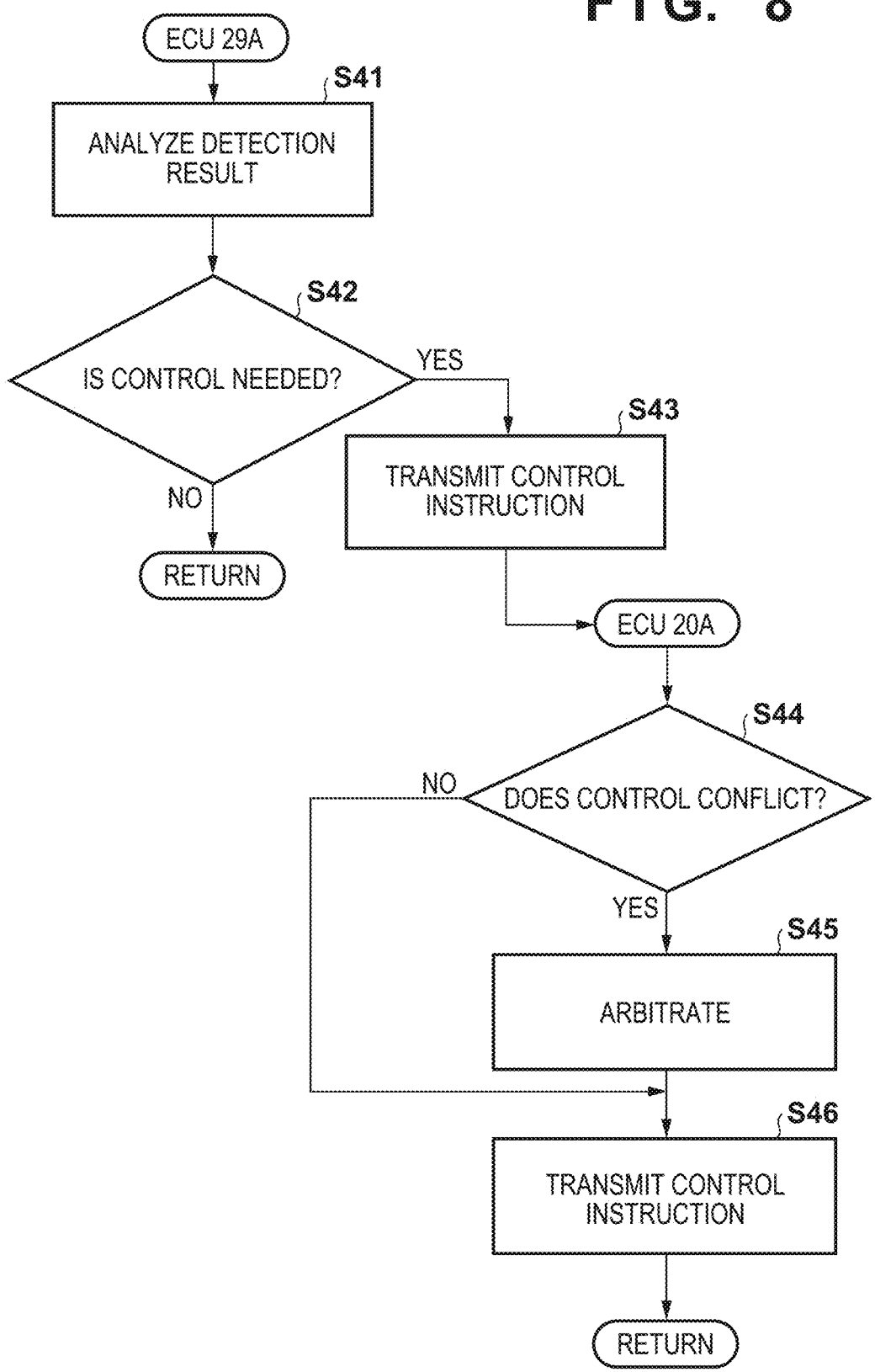
FIG. 8 is a flowchart showing an example of processing executed by the system according to the embodiment.

FIG. 8 shows an example of the processes of the ECU 29A and the ECU 20A. In this embodiment, when the ECU 29A transmits a control instruction by the collision reduction brake control, the control instruction is transmitted to the ECU 23A not directly but through the ECU 20A. The conflict of control instructions is more reliably avoided by temporarily transmitting the control instruction to the ECU 20A and then transmitting the control instruction from the ECU 20A to the ECU 23A. Note that in this embodiment, even in the manual driving mode in which the conflict of control instructions does not occur, when the ECU 29A transmits a control instruction by the collision reduction brake control, the control instruction is transmitted to the ECU 23A not directly but through the ECU 20A. This can simplify the interface and the control program.

In step S41, the ECU 29A acquires the detection result of the detection unit 31A and analyzes it. In step S42, according to the analysis result in step S41, it is determined whether the operation of the brake device 51 is necessary. For example, if an obstacle suddenly appears in front of the vehicle, it is determined that the operation of the brake device 51 is necessary. If the operation of the brake device 51 is necessary, the process advances to step S43. If the operation of the brake device 51 is unnecessary, the processing is ended. In step S43, information concerning the operation request of the brake device 51 and the control amount is transmitted to the ECU 20A as a control instruction. In step S44, the ECU 20A that has received the control instruction determines whether the control instruction conflicts with the control instruction of its own. That is, it is determined whether the ECU 20A is executing the collision reduction brake control based on the target data D3. If the collision reduction brake control is not being executed, the process advances to step S46. If the collision reduction brake control is being executed, the process advances to step S45. Note that during the manual driving mode, the process advances to step S46.

In step S45, the ECU 20A arbitrates the control instruction of its own and the control instruction of the ECU 29A. As the method of arbitration, for example, one of the control amounts may be selected, or the intermediate value between the two control amounts may be selected. In a case of collision reduction brake control, the control instruction of the larger control amount (the higher degree of deceleration) may be selected from the viewpoint of safety.

In step S46, the control instruction arbitrated in step S45 or the control instruction of the ECU 29A determined not to cause conflict in step S44 is transmitted to the ECU 23A. The ECU 23A drives the hydraulic device 42A and the brake device 51 in accordance with the received control instruction.

<Alternate Control 1>

Figure 9:
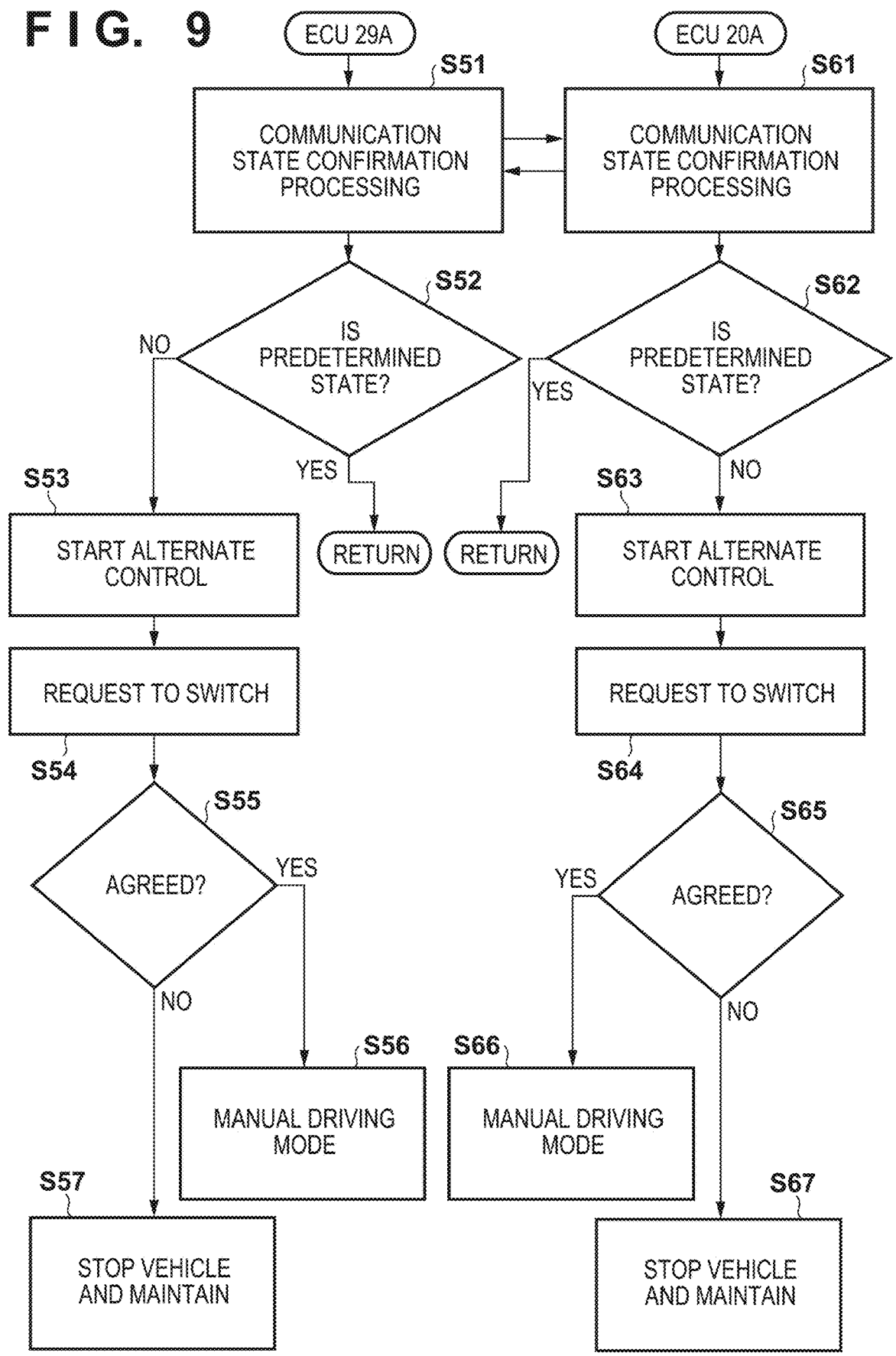
FIG. 9 is a flowchart showing an example of processing executed by the system according to the embodiment.

Processing performed in a case in which performance degradation, power supply shutdown, or communication interruption occurs in the ECU 20A or the ECU 29A during automated driving control will be described next. FIG. 9 is a flowchart showing an example of processing of the ECU 20A and the ECU 29A showing an example. The processing shown in FIG. 9 can periodically be performed during the automated driving mode.

The ECU 20A and the ECU 29A perform processing of confirming each other's communication states (steps S51 and S61). For example, one of them outputs a response request to the other and determines whether a response is received. Alternatively, one of them transmits information to the other, and the other determines whether the received information is predetermined information.

In step S52, the ECU 29A determines whether the processing result in step S51 represents a predetermined state. The predetermined state indicates, for example, a case in which reception of a signal from the ECU 20A can be confirmed. A state other than the predetermined state indicates, for example, a case in which reception of a signal from the ECU 20A cannot be confirmed. The case in which reception of a signal can be confirmed is, for example, a case in which a signal according to predetermined information can be received. The case in which reception of a signal cannot be confirmed is, for example, not only a case in which a signal cannot be received but also a case in which a signal is received, but it is not a correct signal (predetermined information in the above example).

If the state is the predetermined state, the ECU 29A determines that performance degradation or the like has not occurred in the ECU 20A, and ends the processing. If the state is not the predetermined state, the process advances to step S53 to start alternate control as traveling control. The alternate control according to this embodiment decelerates and stops the vehicle V.

The ECU 29A instructs the ECU 25A to make a notification, and causes the information output device 43A to output a message representing that the vehicle V decelerates and stops and notify the driver of it. In addition, the ECU 29A instructs the ECU 26A to make a notification, and blinks the information output device 44A (hazard lamp) to call the attention of the following vehicle. Then, the ECU 29A instructs the ECU 23A to do braking, and decelerates the vehicle V. At this time, the ECU 29A instructs the ECU 22A to do steering based on the detection result of the detection unit 31A so the vehicle V does not depart from the lane (lane departure suppression control). Note that during the automated driving mode, the ECU 29A executes the lane departure suppression control even if it is limited.

After the start of the alternate control, in step S54, the ECU 20A requests the driver to do switching (takeover) from automated driving to manual driving. This switching request is done by, for example, displaying the switching request on the information output device 43A. In step S55, it is determined whether the driver has agreed with the switching request. The driver can indicate the intention of agreement by, for example, the input device 45A. Alternatively, the intention of agreement can be confirmed based on the detection result of steering by the driver, which is obtained by the steering torque sensor.

If the driver agrees, the process advances to step S56 to set the manual driving mode. When the mode is switched to the manual driving mode, the ECUs of the control apparatuses 1A and 1B control the traveling of the vehicle V in accordance with the driving operation of the driver. The ECU 29A may instruct the ECUs 21A to 26A of the control apparatus 1A and the ECUs 22B to 25B of the control apparatus 1B to neglect a control instruction from the ECU 20A. Note that since the possibility of performance degradation or the like exists in the ECU 20A, the ECU 29A may output, to the information output device 43A, a message or the like that promotes to take the vehicle V to a maintenance workshop.

If the agreement of the driver cannot be confirmed, the vehicle V stops after a while due to the progress of alternate control. In step S57, the ECU 29A determines the stop of the vehicle V from the detection result of the rotation speed sensor 39, and upon determining that the vehicle V has stopped, instructs the ECU 24A to operate the electric parking lock device 50a, thereby maintaining the stop of the vehicle V.

The processing of the ECU 20A will be described next. In step S62, the ECU 20A determines whether the processing result in step S61 represents a predetermined state. Also here, the predetermined state indicates, for example, a case in which reception of a signal from the ECU 29A can be confirmed. A state other than the predetermined state indicates, for example, a case in which reception of a signal from the ECU 29A cannot be confirmed. The case in which reception of a signal can be confirmed is, for example, a case in which a signal according to predetermined information can be received. The case in which reception of a signal cannot be confirmed is, for example, not only a case in which a signal cannot be received but also a case in which a signal is received, but it is not a correct signal (predetermined information in the above example).

If the state is the predetermined state, the ECU 20A determines that performance degradation or the like has not occurred in the ECU 29A, and ends the processing. If the state is not the predetermined state, the process advances to step S63 to start alternate control as traveling control. Even if performance degradation or the like occurs in the ECU 29A, the ECU 20A can continue automated driving control. However, assuming a case in which performance degradation or the like occurs in the ECU 20A after that, if the possibility of performance degradation or the like exists in the ECU 29A, alternate control is performed. In this embodiment, the alternate control here is similar to the alternate control executed by the ECU 29A, and the ECU 20A decelerates and stops the vehicle V. Note that the alternate control processes executed by the ECU 29A and the ECU 20A may be different traveling control processes. For example, in the alternate control executed by the ECU 20A, the deceleration degree may be more moderate than in the ECU 29A, or yield travel may be included.

The alternate control of the ECU 20A according to this embodiment will be described. The ECU 20A instructs the ECU 25A to make a notification, and causes the information output device 43A to output a message representing that the vehicle V decelerates and stops and notify the driver of it. In addition, the ECU 20A instructs the ECU 26A to make a notification, and blinks the information output device 44A (hazard lamp) to call the attention of the following vehicle. Then, the ECU 20A instructs the ECU 23A to do braking, and decelerates the vehicle V. At this time, the ECU 20A instructs the ECU 22A to do steering based on the detection results of the detection units 31A and 32A so the vehicle V does not depart from the lane (lane departure suppression control).

After the start of the alternate control, in step S64, the ECU 20A requests the driver to do switching (takeover) from automated driving to manual driving. This switching request is done by, for example, displaying the switching request on the information output device 43A. In step S65, it is determined whether the driver has agreed with the switching request. The driver can indicate the intention of agreement by, for example, the input device 45A. Alternatively, the intention of agreement can be confirmed based on the detection result of steering by the driver, which is obtained by the steering torque sensor.

If the driver agrees, the process advances to step S66 to set the manual driving mode. When the mode is switched to the manual driving mode, the ECUs of the control apparatuses 1A and 1B control the traveling of the vehicle V in accordance with the driving operation of the driver. The ECU 20A may also instruct the ECUs 21A to 26A of the control apparatus 1A and the ECUs 22B to 25B of the control apparatus 1B to neglect a control instruction from the ECU 29A. Note that since the possibility of performance degradation or the like exists in the ECU 29A, the ECU 20A may output, to the information output device 43A, a message that promotes to take the vehicle V to a maintenance workshop.

If the agreement of the driver cannot be confirmed, the vehicle V stops after a while due to the progress of alternate control. In step S67, the ECU 20A determines the stop of the vehicle V from the detection result of the rotation speed sensor 39, and upon determining that the vehicle V has stopped, instructs the ECU 24A to operate the electric parking lock device 50a, thereby maintaining the stop of the vehicle V.

Note that in this embodiment, communication state confirmation processing is performed in steps S51 and S61. This processing may be performed in the communication processing executed by the ECU 20A and the ECU 29A for vehicle control. As the method of determining whether the state is a predetermined state or not, a checksum may be confirmed, and if a normal control signal cannot be received continuously a predetermined number of times, it may be determined that the state is not the predetermined state. Alternatively, a determination method using an alive counter may be used.

The alternate control may be control including switching at least a part of vehicle control performed in the predetermined state to another control. The alternate control may be control using, as the control devices and the actuators, control devices and actuators different from those in the predetermined state. The alternate control may be control using control devices and actuators similar to the predetermined state but using control amounts different from those in the control performed in the predetermined state. The alternate control may be control to which control that is not performed in the predetermined state is added. The alternate control may automate steering, and driving and/or braking of the vehicle V.

A representative example of the alternate control is control of decelerating and stopping the vehicle, as in this embodiment. Another example of the alternate control may be control of maintaining traveling at a speed lower than in the predetermined state. The alternate control may decelerate the vehicle to suppress approach to or contact with an obstacle or a preceding vehicle. The alternate control may include maintaining a lane by steering control, suppressing lane departure of the vehicle, performing steering control to avoid an obstacle, a preceding vehicle, or a following vehicle, pulling the vehicle to a road shoulder, and/or changing the vehicle position (the position in the width direction) in a lane.

If the alternate control is performed, other vehicles on the periphery may be notified, by the hazard lamp or another display device, that the alternate control is being performed, as in this embodiment. Alternatively, a notification may be made by a communication device to other vehicles or other terminal devices.

<Alternate Control 2>

Figure 10:
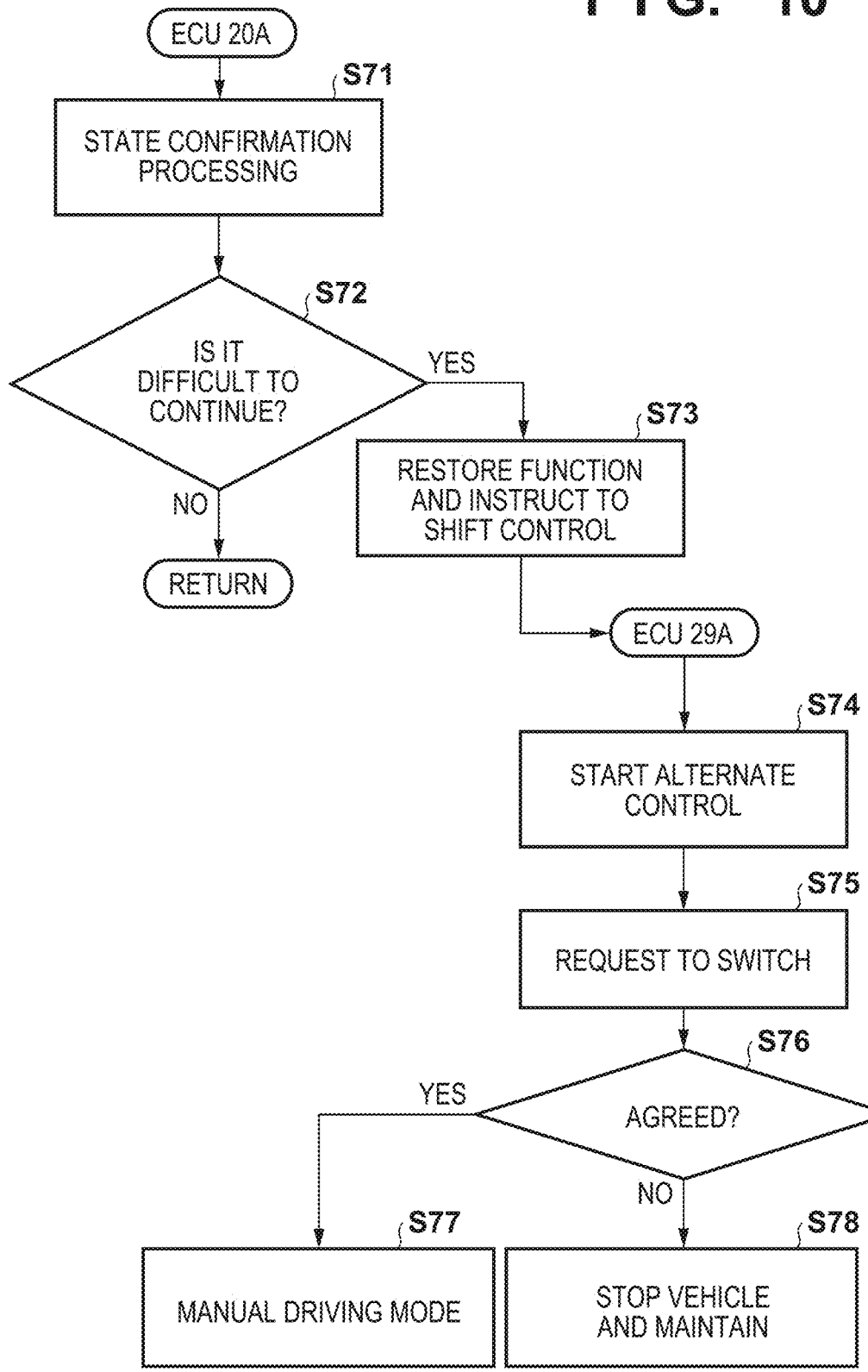
FIG. 10 is a flowchart showing an example of processing executed by the system according to the embodiment.

During the automated driving mode, the ECU 20A may periodically determine whether automated driving control can be continued. Upon determining that it is difficult to continue, an instruction to shift control may be transmitted to the ECU 29A. FIG. 10 is a flowchart showing an example.

In step S71, the ECU 20A performs state confirmation processing of the control apparatus 1A. Here, for example, the ECU 20A performs self-check. In step S72, it is determined, based on the processing result in step S71, whether it is difficult to continue automated driving control. If it is determined that it is difficult to continue, the process advances to step S73. Otherwise, the processing is ended. In step S73, an instruction to shift control is output to the ECU 29A. At this time, if the control functions are limited, restoring is set.

Upon receiving the control shift instruction from the ECU 20A, the ECU 29A starts alternate control in step S74. The processes of steps S74 to S78 are the same as the processes of steps S53 to S57 in FIG. 9. Alternate control and processing concerning a switching request from automated driving to manual driving are performed. The processing thus ends. Note that in this embodiment, the ECU 29A that has received the control shift instruction from the ECU 20A starts the alternate control. However, the ECU 29A may be handed over the automated driving control including acceleration control for a predetermined period.

Second Embodiment

The examples of processing shown in FIGS. 8 to 10 may be performed between an ECU 20A and an ECU 21B.

<Avoidance of Conflict of Control Instructions>

Figure 11:
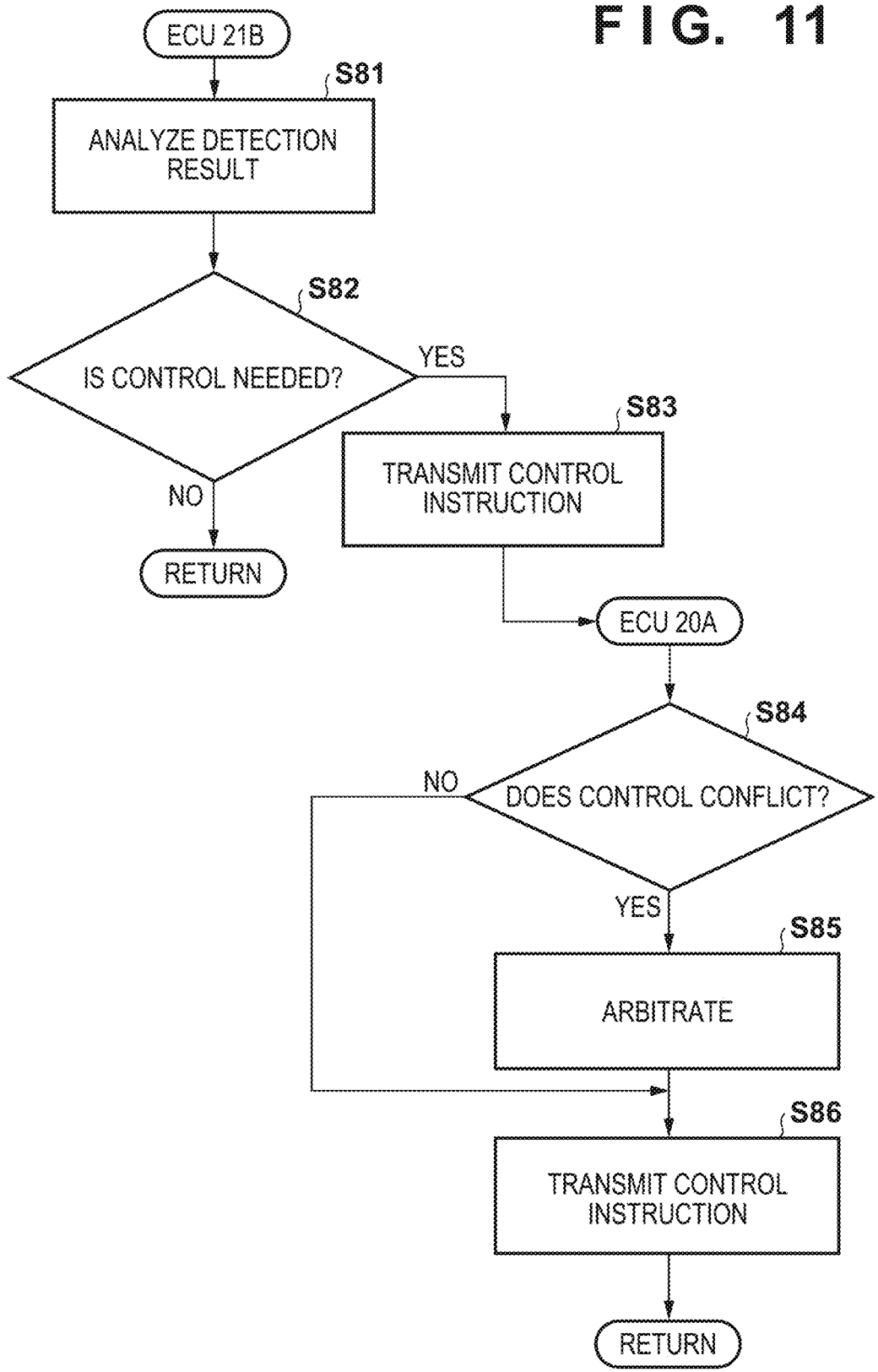
FIG. 11 is a flowchart showing an example of processing executed by a system according to another embodiment.

FIG. 11 shows an example of the processes of the ECU 20A and the ECU 21B concerning arbitration shown in FIG. 8. In this embodiment as well, as for a control instruction that can conflict, the ECU 21B transmits the control instruction to a corresponding ECU not directly but through the ECU 20A.

In step S81, the ECU 21B acquires the detection results of detection units 31B and 32B and analyzes them. In step S82, according to the analysis result in step S81, it is determined whether a control operation (for example, the operation of a brake device 51) is necessary. If the control operation is necessary, the process advances to step S83. If the control operation is unnecessary, the processing is ended. In step S83, the ECU 21B transmits a control instruction to the ECU 20A. In step S84, the ECU 20A that has received the control instruction determines whether the control instruction conflicts with the control instruction of its own. If the control instructions do not conflict, the process advances to step S86. If the control instructions conflict, the process advances to step S85.

In step S85, the ECU 20A arbitrates the control instruction of its own and the control instruction of the ECU 21B. In step S86, the ECU 20A transmits the control instruction arbitrated in step S85 or the control instruction of the ECU 21B determined in step S84 not to cause conflict to a corresponding ECU. The corresponding ECU drives an actuator in accordance with the received control instruction.

<Alternate Control 1>

Figure 12:
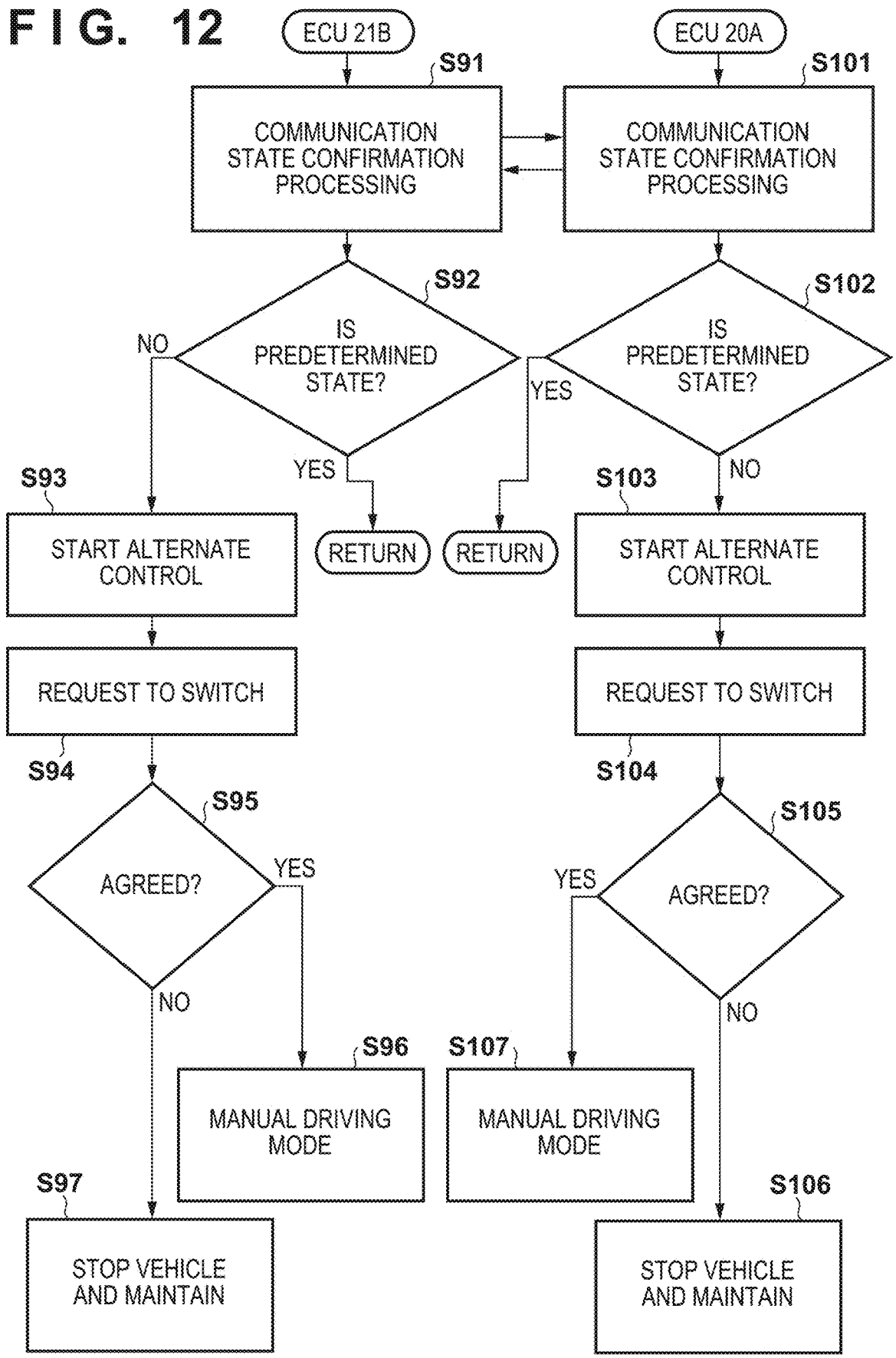
FIG. 12 is a flowchart showing an example of processing executed by the system according to the embodiment in FIG. 11.

FIG. 12 shows an example of the processes of the ECU 20A and the ECU 21B concerning alternate control shown in FIG. 9. The procedure of the processing shown in FIG. 12 is basically similar to that of the processing shown in FIG. 9, and can periodically be performed during the automated driving mode.

The ECU 20A and the ECU 21B perform processing of confirming each other's communication states (steps S91 and S101). For example, one of them outputs a response request to the other and determines whether a response is received.

In step S92, the ECU 21B determines whether the processing result in step S91 represents a predetermined state. The predetermined state indicates, for example, a case in which reception of a signal from the ECU 20A can be confirmed. A state other than the predetermined state indicates, for example, a case in which reception of a signal from the ECU 20A cannot be confirmed. The case in which reception of a signal can be confirmed is, for example, a case in which a signal according to predetermined information can be received. The case in which reception of a signal cannot be confirmed is, for example, not only a case in which a signal cannot be received but also a case in which a signal is received, but it is not a correct signal (predetermined information in the above example).

If the state is the predetermined state, the ECU 21B determines that performance degradation or the like has not occurred in the ECU 20A, and ends the processing. If the state is not the predetermined state, the process advances to step S93 to start alternate control as traveling control. The alternate control decelerates and stops the vehicle V. The ECU 21B instructs an ECU 25B to make a notification, and causes the information output device 44B to display a message representing that the vehicle V decelerates and stops and notify the driver of it. In addition, the ECU 21B instructs an ECU 23B to make a notification, and lights or blinks a brake lamp 43B to call the attention of the following vehicle. Note that the ECU 21B may instruct a light ECU 26A to make a notification and operate an information output device 44A (blink the hazard lamp). Then, the ECU 21B instructs the ECU 23B to do braking, and decelerates the vehicle V. At this time, the ECU 21B instructs an ECU 22B to do steering based on the detection results of the detection units 31B and 32B so the vehicle V does not depart from the lane (or from a road section line) (lane departure suppression control).

After the start of the alternate control, in step S94, the ECU 21B requests the driver to do switching (takeover) from automated driving to manual driving. This switching request is done by, for example, displaying the switching request on the information output device 44B. In step S95, it is determined whether the driver has agreed with the switching request. The driver can indicate the intention of agreement by, for example, an input device 45B. Alternatively, the intention of agreement can be confirmed based on the detection result of steering by the driver, which is obtained by the steering torque sensor.

If the driver agrees, the process advances to step S96 to set the manual driving mode. The setting here may be processing in which the ECU 21B instructs the ECUs 21A to 26A of a control apparatus 1A and the ECUs 22B to 25B of a control apparatus 1B to end the automated driving mode and neglect a control instruction from the ECU 20A. The ECUs of the control apparatuses 1A and 1B control the traveling of the vehicle V in accordance with the driving operation of the driver. However, since the possibility of performance degradation or the like exists in the ECU 20A, the ECU 21B may display, on the information output device 44B, a message that promotes to take the vehicle V to a maintenance workshop.

If the agreement of the driver cannot be confirmed, the vehicle V stops after a while due to the progress of alternate control. In step S97, the ECU 21B determines the stop of the vehicle V from the detection result of a wheel speed sensor 38, and upon determining that the vehicle V has stopped, instructs the ECU 24B to operate an electric parking brake device 52, thereby maintaining the stop of the vehicle V.

The processing of the ECU 20A will be described next. In step S102, the ECU 20A determines whether the processing result in step S101 represents a predetermined state. Also here, the predetermined state indicates, for example, a case in which reception of a signal from the ECU 21B can be confirmed. A state other than the predetermined state indicates, for example, a case in which reception of a signal from the ECU 21B cannot be confirmed. The case in which reception of a signal can be confirmed is, for example, a case in which a signal according to predetermined information can be received. The case in which reception of a signal cannot be confirmed is, for example, not only a case in which a signal cannot be received but also a case in which a signal is received, but it is not a correct signal (predetermined information in the above example).

If the state is the predetermined state, the ECU 20A determines that performance degradation or the like has not occurred in the ECU 21B, and ends the processing. If the state is not the predetermined state, the process advances to step S103 to start alternate control as traveling control. Even if performance degradation or the like occurs in the ECU 21B, the ECU 20A can continue automated driving control. However, assuming a case in which performance degradation or the like occurs in the ECU 20A after that, if the possibility of performance degradation or the like exists in the ECU 21B, alternate control is performed. In this embodiment, the alternate control here is similar to the alternate control executed by the ECU 21B, and the ECU 20A decelerates and stops the vehicle V. However, the devices to be used are different. Note that the alternate control processes executed by the ECU 21B and the ECU 20A may be different traveling control processes. For example, in the alternate control executed by the ECU 20A, the deceleration degree may be more moderate than in the ECU 21B, or yield travel may be included.

The alternate control of the ECU 20A according to this embodiment will be described. The ECU 20A instructs the ECU 25A to make a notification, and causes an information output device 43A to output a message representing that the vehicle V decelerates and stops and notify the driver of it. In addition, the ECU 20A instructs the ECU 26A to make a notification, and blinks the information output device 44A (hazard lamp) to call the attention of the following vehicle. Then, the ECU 20A instructs the ECU 23A to do braking, and decelerates the vehicle V. At this time, the ECU 20A instructs the ECU 22A to do steering based on the detection results of detection units 31A and 32A so the vehicle V does not depart from the lane (or from a road section line) (lane departure suppression control).

After the start of the alternate control, in step S104, the ECU 20A requests the driver to do switching (takeover) from automated driving to manual driving. This switching request is done by, for example, displaying the switching request on the information output device 43A. In step S105, it is determined whether the driver has agreed with the switching request. The driver can indicate the intention of agreement by, for example, an input device 45A. Alternatively, the intention of agreement can be confirmed based on the detection result of steering by the driver, which is obtained by the steering torque sensor.

If the driver agrees, the process advances to step S107 to set the manual driving mode. When the mode is switched to the manual driving mode, the ECUs of the control apparatuses 1A and 1B control the traveling of the vehicle V in accordance with the driving operation of the driver. The ECU 20A may also instruct the ECUs 21A to 26A and 29A of the control apparatus 1A and the ECUs 22B to 25B of the control apparatus 1B to neglect a control instruction from the ECU 21B. Note that since the possibility of performance degradation or the like exists in the ECU 21B, the ECU 20A may output, to the information output device 43A, a message that promotes to take the vehicle V to a maintenance workshop.

If the agreement of the driver cannot be confirmed, the vehicle V stops after a while due to the progress of alternate control. In step S106, the ECU 20A determines the stop of the vehicle V from the detection result of the rotation speed sensor 39, and upon determining that the vehicle V has stopped, instructs the ECU 24A to operate an electric parking lock device 50a, thereby maintaining the stop of the vehicle V. As described above, both the control apparatuses 1A and 1B can execute the alternate control.

Note that in this embodiment, communication state confirmation processing is performed in steps S91 and S101. This processing may be performed in the communication processing executed by the ECU 20A and the ECU 21B for vehicle control. As the method of determining whether the state is a predetermined state or not, a checksum may be confirmed, and if a normal control signal cannot be received continuously a predetermined number of times, it may be determined that the state is not the predetermined state. Alternatively, a determination method using an alive counter may be used.

Next, in the example shown in FIG. 12, the ECU 21B controls the devices of the control apparatus 1B in the alternate control started in step S93. Here, even if it is determined in step S92 that the state is the predetermined state, the devices other than the ECU 20A of the control apparatus 1A are sometimes operable and usable without performance degradation or the like. Hence, in the alternate control of step S93, the ECU 21B may execute the alternate control using at least any of the detection units 31A and 32A and the ECUs 21A to 26A of the control apparatus 1A. Similarly, in the alternate control of step S103, the ECU 20A may execute the alternate control using at least any of the detection units 31B and 32B and the ECUs 22B to 25B of the control apparatus 1B.

As described above, when the ECU 20A of the control apparatus 1A uses the devices of the control apparatus 1B, or when the ECU 21B of the control apparatus 1B uses the devices of the control apparatus 1A, it is preferably always confirmed whether performance degradation or the like occurs in each ECU. To do this, for example, the ECU 20A may perform processing of confirming the states of the ECUs 21A to 29A of the control apparatus 1A by communication. For example, a response request signal may be transmitted from the ECU 20A to the ECUs 21A to 29A, and whether performance degradation or the like occurs in each ECU may be confirmed based on the presence/absence or contents of a response from each of the ECUs 21A to 29A. This processing may be performed at the time of communication for vehicle control or may be performed periodically. The ECU 21B may be notified of the response result. Similarly, the ECU 21B may perform processing of confirming communication states with the ECUs 22B to 25B of the control apparatus 1B. For example, a response request signal may be transmitted from the ECU 21B to the ECUs 22B to 25B, and whether performance degradation or the like occurs in each ECU may be confirmed based on the presence/absence or contents of a response from each of the ECUs 22B to 25B. This processing may be performed at the time of communication for vehicle control or may be performed periodically. The ECU 20A may be notified of the response result.

In addition, the ECU 20A may perform processing of confirming the states of the ECUs 22B to 25B of the control apparatus 1B by communication. Similarly, the ECU 21B may perform processing of confirming the states of the ECUs 21A to 28A of the control apparatus 1A by communication.

<Alternate Control 2>

Figure 13:
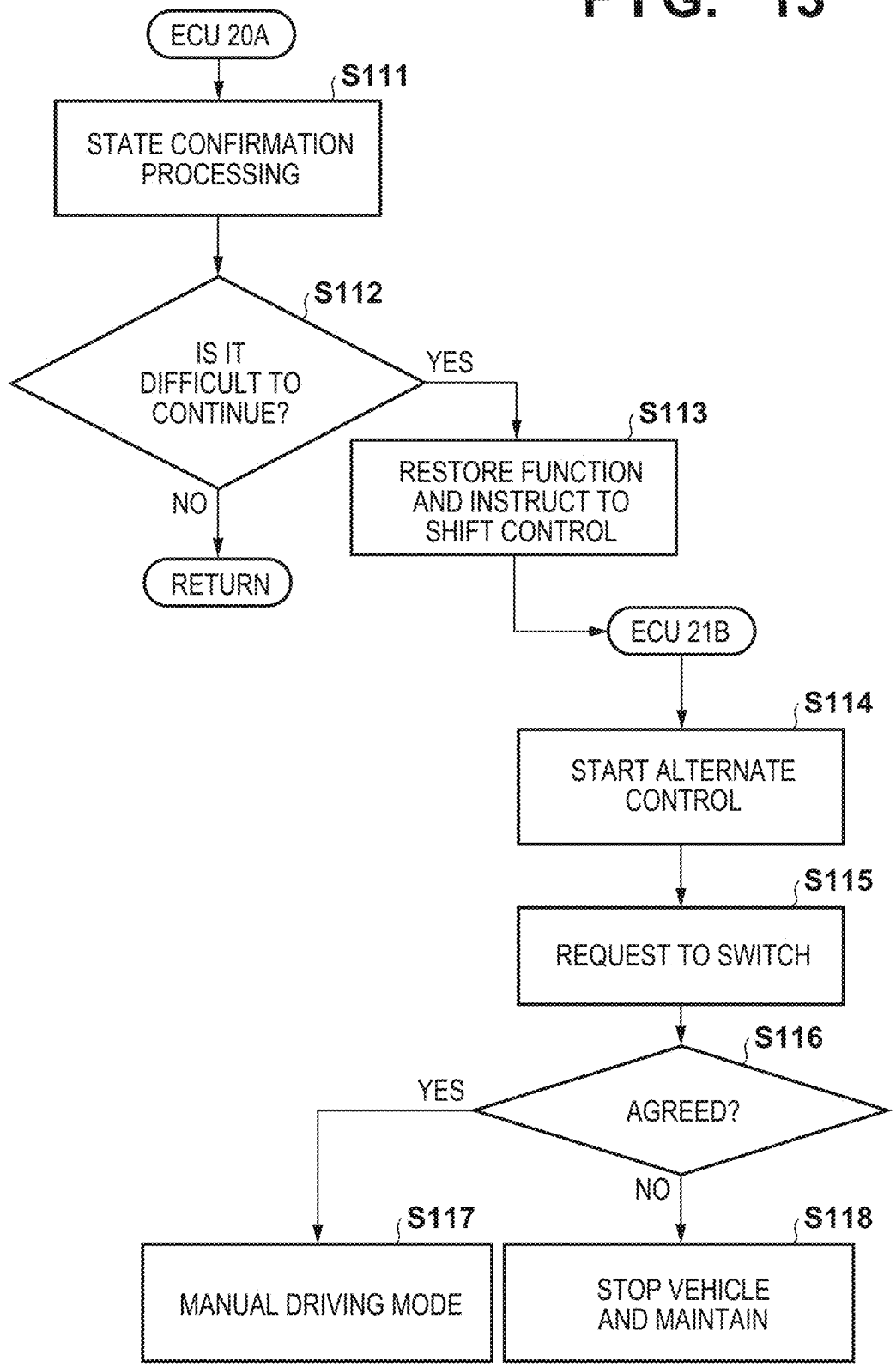
FIG. 13 is a flowchart showing an example of processing executed by the system according to the embodiment in FIG. 11.

During the automated driving mode, the ECU 20A may periodically determine whether automated driving control can be continued. Upon determining that it is difficult to continue, an instruction to shift control may be transmitted to the ECU 21B. FIG. 13 is a flowchart showing an example.

In step S111, the ECU 20A performs state confirmation processing of the control apparatus 1A. Here, for example, processing of confirming the states of the ECUs 21A to 29A of the control apparatus 1A is performed by communication. In step S112, it is determined, based on the processing result in step S111, whether it is difficult to continue automated driving control. If it is determined that it is difficult to continue, the process advances to step S113. Otherwise, the processing is ended. For example, in a case in which a state in which a failure occurs in the automated driving control is confirmed such as a case in which no response is received from any of the ECUs, it is determined that it is difficult to continue. In step S113, an instruction to shift control is output to the ECU 21B. At this time, if the control functions are limited, restoring is set.

Upon receiving the control shift instruction from the ECU 20A, the ECU 21B starts alternate control in step S114. The processes of steps S114 to S118 are the same as the processes of steps S93 to S97 in FIG. 12. Alternate control and processing concerning a switching request from automated driving to manual driving are performed. The processing thus ends. Note that in this embodiment, the ECU 21B that has received the control shift instruction from the ECU 20A starts the alternate control. However, the ECU 21B may be handed over the automated driving control including acceleration control for a predetermined period.

<Combinations>

The avoidance of conflict of control instructions and alternate controls 1 and 2 concerning the ECU 29A according to the first embodiment and the avoidance of conflict of control instructions and alternate controls 1 and 2 concerning the ECU 21B according to the second embodiment can appropriately be combined. Both ECUs may perform all processes or may perform some processes. For example, alternate controls 1 and 2 may not be performed for the ECU 29A, and alternate controls 1 and/or 2 may be performed only for the ECU 21B. In addition, an arrangement without conflict of control instructions may be employed for the ECU 21B, and the avoidance of conflict of control instructions may be performed only for the ECU 29A.

Third Embodiment

In the above-described embodiments, control of automating all of driving, braking, and steering has been explained as automated driving control executed by an ECU 20A in an automated driving mode. However, the automated driving control need only be controlling driving, braking, and/or steering without depending on the driving operation of the driver. Controlling without depending on the driving operation of the driver can include controlling without an input from the driver to operators represented by a steering handle and pedals, or it can also be said that the driver's intention to drive the vehicle is not essential. Hence, in the automated driving control, a state in which the surroundings monitoring duty is imposed on the driver, and driving, braking, and/or steering of a vehicle V is controlled in accordance with the surrounding environment information of the vehicle V may occur, a state in which the surroundings monitoring duty is imposed on the driver, and steering, and driving and/or braking of the vehicle V are controlled in accordance with the surrounding environment information of the vehicle V may occur, or a state in which all of driving, braking, and steering of the vehicle V are controlled in accordance with the surrounding environment information of the vehicle V without the surroundings monitoring duty on the driver may occur. In addition, the control may transition to these control stages. In addition, a sensor configured to detect the state information (biological information such as a heartbeat and state information such as a facial expression and pupil) of the driver may be provided, and the automated driving control may be executed or suppressed in accordance with the detection result of the sensor.

On the other hand, driving support control (or traveling support control) executed by an ECU 29A or an ECU 21B may be controlling driving, braking, and/or steering during the driving operation of the driver. "During the driving operation of the driver" can be said to be a case in which an input from the driver to an operator exists, or a case in which contact of the driver on an operator can be confirmed, and the driver's intention to drive the vehicle can be perceived. The driving support control can include both control executed when the driver selects its start through a switch operation or the like and control executed without selection of its start by the driver. Examples of the former control whose start is selected by the driver are preceding vehicle follow-up control and lane maintaining control. These can also be defined as part of automated driving control.

Examples of the latter control executed without selection of its start by the driver are collision reduction brake control, lane departure suppression control, and erroneous start suppression control.

In addition, a sensor configured to detect the state information (biological information such as a heartbeat and state information such as a facial expression and pupil) of the driver may be provided, and the driving support control may be executed in accordance with the detection result of the sensor.

Summary of Embodiments

1. A vehicle control system (for example, 1) according to the above embodiment is a vehicle control system comprising:

a first traveling control unit (for example, 20A) configured to perform traveling control of controlling driving, braking, and/or steering of a vehicle without depending on a driving operation of a driver; and a second traveling control unit (for example, 29A, 21B) configured to control driving, braking, and/or steering of the vehicle, wherein in a case in which control instructions concerning the same actuator conflict between the first traveling control unit and the second traveling control unit, the first traveling control unit is configured to arbitrate the control instructions (for example, S45, S85).

According to this embodiment, it is possible to avoid conflict of control instructions and improve the safety of vehicle control.

2. In the above embodiment, in a case in which control instructions concerning an actuator concerning braking of the vehicle conflict between the first traveling control unit and the second traveling control unit, the first traveling control unit is configured to select the control instruction of a larger braking amount, thereby arbitrating the control instructions.

In this embodiment, it is possible to raise the safety.

3. In the above embodiment, the first traveling control unit outputs the selected control instruction and drives the actuator (for example, S46, S86).

In this embodiment, since the first traveling control unit directly outputs the control instruction, complex arbitration processing need not be performed on the actuator side.

4. In the above embodiment, in a case in which the traveling control is performed by the first traveling control unit, at least some control processes by the second traveling control unit are limited (for example, S3).

According to this embodiment, it is possible to limit providing of control functions that interfere or control functions of low necessity and improve the safety of vehicle control.

5. In the above embodiment, the traveling control includes control (for example, lane maintaining control) of steering the vehicle without depending on the driving operation of the driver, and in a case in which the traveling control is performed, control (for example, lane departure suppression control) of steering of the vehicle by the second traveling control unit is limited.

According to this embodiment, it is possible to limit control functions that interfere.

6. In the above embodiment, the first traveling control unit and the second traveling control unit are communicably connected, the traveling control includes first steering control (for example, lane maintaining control) concerning a position of the vehicle with respect to a lane, the second traveling control unit is configured to perform second steering control (for example, lane departure suppression control) concerning the position of the vehicle with respect to the lane, and in a case in which the traveling control is performed, the second steering control is limited, and the second traveling control unit is configured to start the second steering control depending on a reception result of a signal received from the first traveling control unit (for example, S53, S74, S93, S114).

According to this embodiment, it is possible to limit control functions that interfere and, in a case in which performance degradation or the like has occurred in the first traveling control unit, restore the limited control functions and improve the safety.

7. In the above embodiment, the system further comprises a third traveling control unit (for example, 21B) configured to control driving, braking, and/or steering of the vehicle, the first traveling control unit and the third traveling control unit are communicably connected, the traveling control includes first steering control (for example, lane maintaining control) concerning a position of the vehicle with respect to a lane, the third traveling control unit is configured to perform second steering control (for example, lane departure suppression control) concerning the position of the vehicle with respect to the lane, and in a case in which the traveling control is performed, the second steering control is limited, and the third traveling control unit starts the second steering control depending on a reception result of a signal received from the first traveling control unit (for example, S93, S114).

According to this embodiment, it is possible to limit control functions that interfere and, in a case in which performance degradation or the like has occurred in the first traveling control unit, restore the limited control functions and improve the safety.

8. In the above embodiment, in a case in which an acceleration operation by the driver is performed in not less than a predetermined amount in a stop state of the vehicle, the second traveling control unit is configured to perform acceleration limitation control (for example, erroneous start suppression control) of limiting acceleration of the vehicle, and even in a case in which the traveling control is performed, the acceleration limitation control is performed.

In this embodiment, it is possible to improve the safety.

9. In the above embodiment, the system further comprises a notification unit configured to notify the driver of presence of another vehicle traveling on a lane adjacent to a traveling lane of the vehicle, the traveling control includes lane change control of moving the vehicle to the adjacent lane without depending on the driving operation of the driver, and in a case in which the lane change control is performed, a notification by the notification unit is limited.

According to this embodiment, it is possible to prevent a notification from being unnecessarily made.

10. In the above embodiment, the system further comprises a notification unit configured to notify the driver of a start of another vehicle ahead of the vehicle, and when the traveling control is performed, a notification by the notification unit is limited.

According to this embodiment, it is possible to prevent a notification from being unnecessarily made.

11. A vehicle control system (for example, 1) according to the above embodiment is a vehicle control system comprising:

an input unit (for example, 45A) configured to accept an instruction input from a driver;

a first traveling control unit (for example, 20A) configured to automatically perform traveling of a vehicle without depending on a driving operation of the driver in a case in which the instruction input from the driver is accepted by the input unit; and a second traveling control unit (for example, 29A, 21B) configured to perform second traveling control of performing traveling support for the vehicle in response to the driving operation of the driver, wherein in a case in which control instructions concerning the same actuator conflict between the first traveling control unit and the second traveling control unit, the first traveling control unit is configured to arbitrate the control instructions (for example, S45, S85).

According to this embodiment, it is possible to avoid conflict of control instructions and improve the safety of vehicle control.

12. In the above embodiment, the first traveling control unit is configured to set, as a target of arbitration, a control instruction of the second traveling control unit, which is transmitted through the first traveling control unit.

According to this embodiment, it is possible to more reliably avoid conflict of control instructions.

13. A vehicle control system (for example, 1) according to the above embodiment is a vehicle control system comprising a plurality of control units (for example, 20A, 29A, 21B), wherein the plurality of control units comprise a traveling control unit (for example, 20A) configured to automatically perform traveling of a vehicle without depending on a driving operation of a driver, and in a case in which the traveling control unit automatically performs traveling of the vehicle without depending on the driving operation of the driver, at least some functions provided by the control units other than the traveling control unit out of the plurality of control units are limited (for example, S3).

According to this embodiment, it is possible to limit providing of control functions that interfere or control functions of low necessity and improve the safety of vehicle control.

14. In the above embodiment, the limited function is a function (for example, lane departure suppression control) that interferes with a function of the traveling control unit.

According to this embodiment, it is possible to limit control functions that interfere and improve the safety of vehicle control.

15. A control method according to the above embodiment is a control method comprising:

performing traveling control of controlling driving, braking, and/or steering of a vehicle without depending on a driving operation of a driver;

controlling driving, braking, and/or steering of the vehicle; and in a case in which control instructions concerning the same actuator conflict between the performing and the controlling, arbitrating the control instructions.

According to this embodiment, it is possible to avoid conflict of control instructions and improve the safety of vehicle control.

16. A control method according to the above embodiment is a control method of a vehicle control system (for example, 1) including a plurality of control units, the method comprising:

automatically performing traveling of a vehicle without depending on a driving operation of a driver by a traveling control unit (for example, 20A) in the plurality of control units (for example, 20A, 29A, 21B); and in a case in which the traveling control unit automatically performs traveling of the vehicle without depending on the driving operation of the driver, limiting at least some functions provided by the control units other than the traveling control unit out of the plurality of control units (for example, S3).

17. A vehicle control system (for example, 1) according to the above embodiment is a vehicle control system comprising:

a first processor (for example, 20A);

a first storage device (for example, 20A) configured to store a first program to be executed by the first processor;

a second processor (for example, 29A, 21B); and a second storage device (for example, 29A, 21B) configured to store a second program to be executed by the second processor, wherein the first processor performs traveling control of controlling driving, braking, and/or steering of a vehicle without depending on a driving operation of a driver by executing the first program, and in a case in which control instructions concerning the same actuator conflict between the first processor and the second processor, the first processor arbitrates the control instructions by executing the first program.

18. A vehicle control system (for example, 1) according to the above embodiment is a vehicle control system comprising:

a plurality of processors (for example, 20A, 29A, 21B) including a first processor (for example, 20A); and a storage device (for example, 20A) configured to store a first program to be executed by the first processor, wherein the first processor automatically performs traveling of a vehicle without depending on a driving operation of a driver by executing the first program, and in a case in which the first processor automatically performs traveling of the vehicle without depending on the driving operation of the driver, at least some functions provided by the processors other than the first processor out of the plurality of processors are limited.

19. A vehicle control system (for example, 1) according to the above embodiment is a vehicle control system comprising:

a first control apparatus (for example, 1A) configured to control a vehicle; and a second control apparatus (for example, 1B) configured to control the vehicle, wherein the first control apparatus comprises:

an arbitration unit (for example, 20A) configured to, in a case in which control instructions concerning the same actuator conflict between the first control apparatus and the second control apparatus, arbitrate the control instructions.

20. In the above embodiment, the first control apparatus comprises:

a first traveling control unit (for example, 20A) configured to perform traveling control of the vehicle; and a first detection unit (for example, 31A, 32A) configured to detect a surrounding situation of the vehicle, the second control apparatus comprises:

a second traveling control unit (for example, 21B) configured to perform traveling control of the vehicle; and a second detection unit (for example, 31B, 32B) configured to detect the surrounding situation of the vehicle, and the first traveling control unit functions as the arbitration unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A vehicle control system comprising:
a first traveling controller including at least one processor and at least one storage device and configured to control driving, braking, and steering of a vehicle without depending on a driving operation of a driver; and
a second traveling controller including at least one processor and at least one storage device and configured to control driving, braking, and/or steering of the vehicle,
a third traveling controller including at least one processor and at least one storage device and configured to control driving, braking, and/or steering of the vehicle,
wherein a first control command concerning a first actuator by the second traveling controller is outputted through the first traveling controller to a first actuator controller which drives the first actuator, a second control command concerning a second actuator by the third traveling controller is outputted through the first traveling controller to a second actuator controller which drives the second actuator, a third control command concerning the first actuator by the first traveling controller is outputted to the first actuator controller without going through the second traveling controller and the third traveling controller, a fourth control command concerning the second actuator by the first traveling controller is outputted to the second actuator controller without going through the second traveling controller and the third traveling controller, in a case in which the first control command and the third control command conflict, the first traveling controller is configured to arbitrate the first control command and the third control command, and in a case in which the second control command and the fourth control command conflict, the first traveling controller is configured to arbitrate the second control command and the fourth control command.

2. The system according to claim 1, wherein the first actuator is an actuator concerning braking of the vehicle, in a case in which the first control command and the third control command conflict, the first traveling controller is configured to select the first control command or the third control command of a larger braking amount and output the selected control command to the first actuator controller, thereby arbitrating the first control command and the third control command.

3. The system according to claim 1, wherein in a case in which a traveling control of the vehicle is performed by the first traveling controller, at least some control processes by the second traveling controller are limited.

4. The system according to claim 1, wherein when the first traveling controller performs control of steering the vehicle without depending on the driving operation of the driver, control of steering of the vehicle by the second traveling controller is limited.

5. The system according to claim 1, wherein the first traveling controller and the second traveling controller are communicably connected, the first traveling controller is configured to perform first steering control concerning a position of the vehicle with respect to a lane, the second traveling controller is configured to perform second steering control concerning the position of the vehicle with respect to the lane, and in a case in which the first steering control is performed, the second steering control is limited, and the second traveling controller is configured to start the second steering control depending on a reception result of a signal received from the first traveling controller.

6. The system according to claim 1, wherein the first traveling controller and the third traveling controller are communicably connected, the first traveling controller is configured to perform first steering control concerning a position of the vehicle with respect to a lane, the third traveling controller is configured to perform second steering control concerning the position of the vehicle with respect to the lane, and in a case in which the first steering control is performed, the second steering control is limited, and the third traveling controller is configured to start the second steering control depending on a reception result of a signal received from the first traveling controller.

7. The system according to claim 1, wherein in a case in which an acceleration operation by the driver is performed in not less than a predetermined amount in a stop state of the vehicle, the second traveling controller is configured to perform acceleration limitation control of limiting acceleration of the vehicle, and even in a case in which a traveling control by the first traveling controller is performed, the acceleration limitation control is performed.

8. The system according to claim 1, further comprising a notification unit configured to notify the driver of presence of another vehicle traveling on a lane adjacent to a traveling lane of the vehicle, wherein the first traveling controller is configured to perform lane change control of moving the vehicle to the adjacent lane without depending on the driving operation of the driver, and in a case in which the lane change control is performed, a notification by the notification unit is limited.

9. The system according to claim 1, further comprising a notification unit configured to notify the driver of a start of another vehicle ahead of the vehicle, wherein when a traveling control by the first traveling controller is performed, a notification by the notification unit is limited.

10. A control method comprising:

controlling driving, braking, and steering of a vehicle without depending on a driving operation of a driver by a first traveling controller including at least one processor and at least one storage device;

controlling driving, braking, and/or steering of the vehicle by a second traveling controller including at least one processor and at least one storage device, a first control command concerning a first actuator by the second traveling controller being outputted through the first traveling controller to a first actuator controller which drives the first actuator;

controlling driving, braking, and/or steering of the vehicle by a third traveling controller including at least one processor and at least one storage device, a second control command concerning a second actuator by the third traveling controller being outputted through the first traveling controller to a second actuator controller which drives the second actuator;

wherein a third control command concerning the first actuator by the first traveling controller is outputted to the first actuator controller without going through the second traveling controller and the third traveling controller, a fourth control command concerning the second actuator by the first traveling controller is outputted to the second actuator controller without going through the second traveling controller and the third traveling controller, and the method further comprises in a case in which the first control command and the third control command conflict, arbitrating the first control command and the third control command by the first traveling controller, and in a case in which the second control command and the fourth control command conflict, arbitrating the second control command and the fourth control command by the first traveling controller.

* * * * *